United States Patent [19]
Matsubara et al.

[11] Patent Number: 5,500,661
[45] Date of Patent: Mar. 19, 1996

[54] INK JET RECORDING METHOD

[75] Inventors: Miyuki Matsubara, Tokyo; Hiromitsu Hirabayashi, Yokohama; Shigeyasu Nagoshi, Kawasaki; Noribumi Koitabashi, Yokohama; Hitoshi Sugimoto, Kawasaki; Fumihiro Gotoh, Yokohama; Masaya Uetuki, Kawasaki, all of Japan

[73] Assignee: Canon Kabushiki Kaisha, Tokyo, Japan

[21] Appl. No.: 484,912

[22] Filed: Jun. 7, 1995

Related U.S. Application Data

[63] Continuation of Ser. No. 83,542, Jun. 30, 1993, abandoned.

[30] Foreign Application Priority Data

Jul. 6, 1992 [JP] Japan ................ 4-178391

[51] Int. Cl.⁶ ........................... B41J 2/01
[52] U.S. Cl. ............... 347/41; 347/43; 347/16; 347/9
[58] Field of Search ............... 347/9, 40, 41, 347/43, 16

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 4,748,453 | 5/1988 | Lin et al. ............... 347/41 |
| 4,967,203 | 10/1990 | Doan et al. ............ 347/41 |
| 5,070,345 | 12/1991 | Lahut et al. ........... 347/41 |
| 5,155,503 | 10/1992 | Tasaki ................ 347/9 X |
| 5,359,355 | 10/1994 | Nagoshi ................ 347/9 |
| 5,384,587 | 1/1995 | Takagi ................ 347/41 |

FOREIGN PATENT DOCUMENTS

| | | | |
|---|---|---|---|
| 0046118 | 2/1982 | European Pat. Off. | H04N 1/18 |
| 0430451 | 6/1991 | European Pat. Off. | B41J 2/21 |
| 54-056847 | 5/1979 | Japan | B41M 5/26 |
| 55-113573 | 9/1980 | Japan | B41J 3/04 |
| 58-194541 | 11/1983 | Japan | B41J 3/00 |
| 59-123670 | 7/1984 | Japan | B41J 3/04 |
| 59-138461 | 8/1984 | Japan | B41J 3/04 |
| 60-071260 | 4/1985 | Japan | B41J 3/04 |
| 60-107975 | 6/1985 | Japan | H04N 1/23 |

*Primary Examiner*—Joseph W. Hartary
*Attorney, Agent, or Firm*—Fitzpatrick, Cella, Harper & Scinto

[57] ABSTRACT

A plurality of recording heads for ejecting inks in different colors are aligned, and are reciprocally moved in the alignment direction, and an image is recorded by performing main scans in both the forward and backward paths of the reciprocal movement, and performing a sub-scan after each main scan. An area recordable in a single main scan is thinned out according to thinning arrangements having a complementary relationship therebetween, and thinned-out images are recorded in a plurality of main scans. During this interval, the sub-scan is performed in a direction opposite to the normal sub-scan direction at a predetermined period.

19 Claims, 20 Drawing Sheets

DENSITY

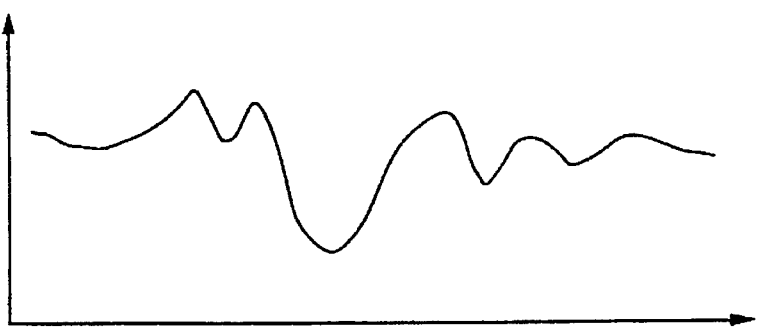
FIG. 13C PRIOR ART
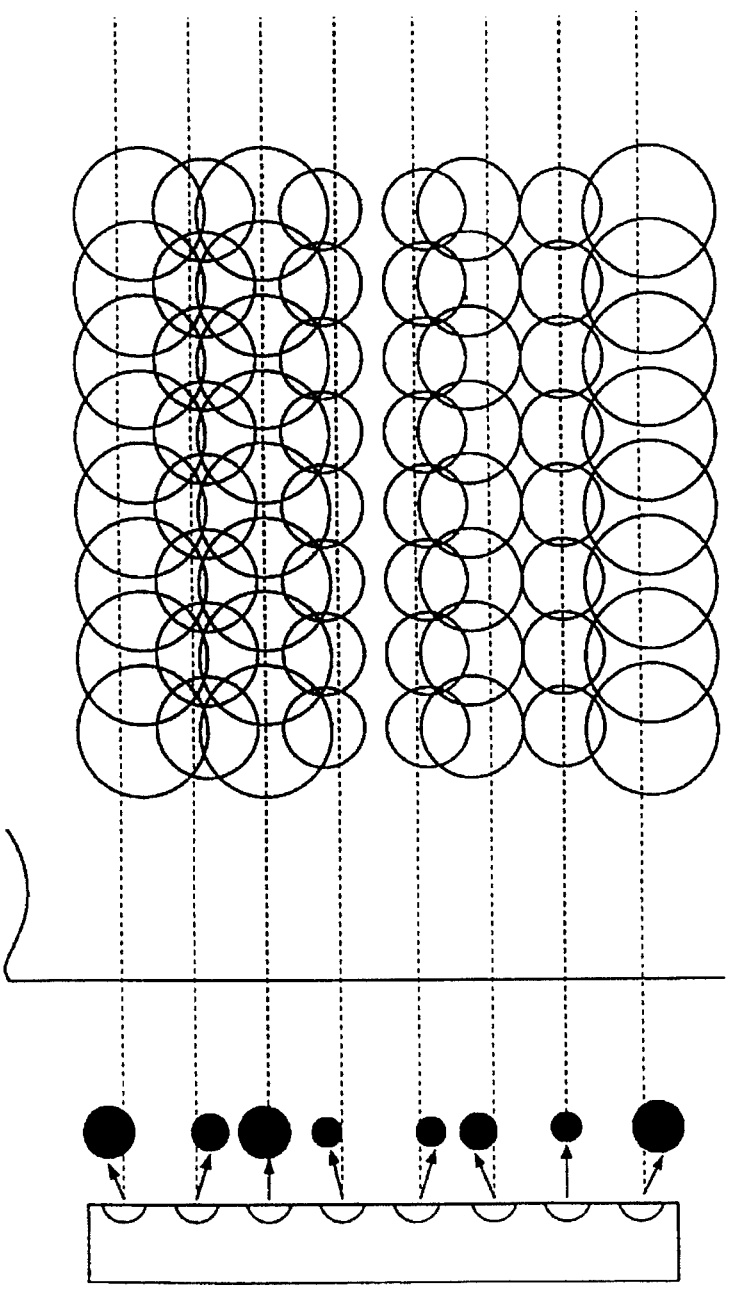
FIG. 13B PRIOR ART
FIG. 13A PRIOR ART

CHECKER

REVERSE CHECKER

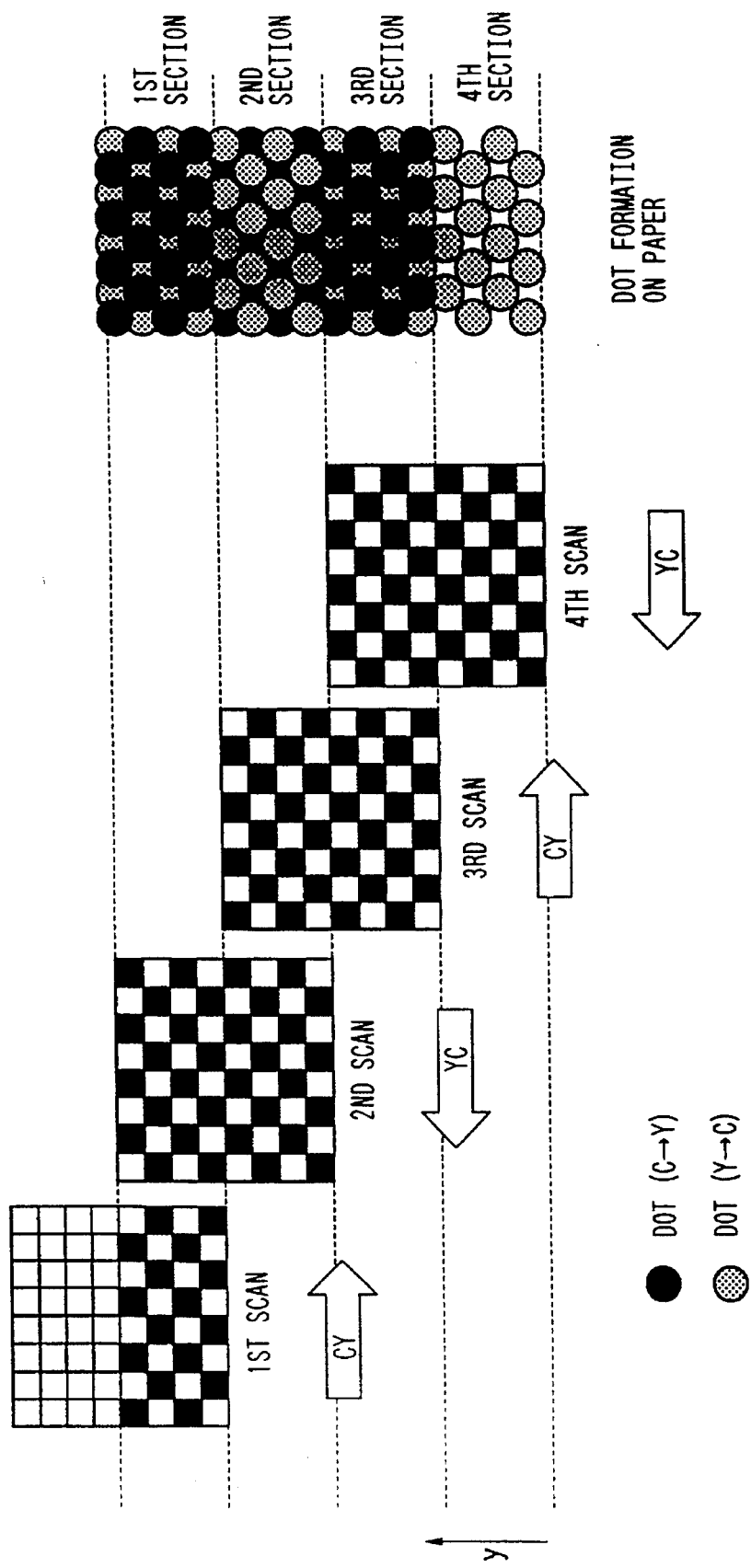

INK JET RECORDING METHOD

This application is a continuation of application Ser. No. 08/083,542 filed Jun. 30, 1993, now abandoned.

BACKGROUND OF THE INVENTION

1. Field of the Invention

The present invention relates to an ink jet recording method for recording an image by ejecting ink droplets onto a recording medium.

2. Related Background Art

With spread of copying machines, information equipment such as wordprocessors, computers, and the like, and communication equipment, an apparatus for performing digital image recording using an ink jet recording head has become increasingly popular as one of recording apparatuses for such equipment. A recording apparatus of this type uses a head prepared by integrating a plurality of ink ejection orifices and ink channels as a recording head (to be referred to as a multi-head hereinafter) in which a plurality of recording elements are integrated and aligned for the purpose of an increase in recording speed. Furthermore, a color recording apparatus normally comprises a plurality of multi-heads.

Unlike in a monochrome printer for printing characters alone, when a color image is to be printed, various characteristics such as color development characteristics, gradation characteristics, uniformity, and the like are required. In particular, as for the uniformity, a small variation in units of nozzles, which is generated during a multi-head manufacturing process, influences the ejection amount or ejection direction of an ink of each nozzle, and consequently deteriorates image quality as a density nonuniformity of a printed image.

An example of the density nonuniformity will be explained below with reference to FIGS. 12A to 13C. In FIG. 12A, a multi-head 91 is constituted by eight multi-nozzles 92 for ejecting ink droplets 93. Normally, the multi-nozzles 92 ideally eject the ink droplets in a uniform amount and in a uniform direction, as shown in FIG. 12A. If such ejection is performed, dots having a uniform size land on a sheet surface, as shown in FIG. 12B, and a uniform image free from the density nonuniformity can be obtained as a whole (FIG. 12C).

However, in practice, each nozzle suffers from a variation, as described above. If a print operation is performed in the same manner as described above, ink droplets having various sizes are ejected from the nozzles in various directions, as shown in FIG. 13A, and land on a sheet surface, as shown in FIG. 13B. As shown in FIG. 13B, a blank portion, which does not satisfy an area factor of 100%, conversely, a portion where dots unnecessarily overlap each other, and a white line (at the center of FIG. 13B) periodically appear in the head main scan direction. The group of dots which landed in the state shown in FIG. 13B has a density distribution shown in FIG. 13C in the nozzle alignment direction, and consequently, such a phenomenon is normally observed as a density nonuniformity by the human eye.

As a countermeasure against such density nonuniformity, the following method has been proposed. The method will be described below with reference to FIGS. 14A to 15C. According to this method, in order to complete a print area shown in FIGS. 12A to 13C, the multi-head 91 is scanned (main scan) three times, and a half area in units of four pixels is completed by two passes. In this case, the eight nozzles of the multi-head are divided into two groups respectively including upper four nozzles and lower four nozzles. Dots to be printed by one nozzle in a single scan are obtained by thinning out given image data to about a half according to a predetermined image data arrangement. In the second scan, dots corresponding to the remaining half image data are recorded, thus completing the area in units of four pixels. The above-mentioned recording method will be referred to as a divisional recording method hereinafter.

When such a recording method is used, even if a head equivalent to the multi-head shown in FIG. 13A is used, since the influence of the nozzles to a printed image is reduced to half, an image shown in FIG. 14B is printed, and black and white lines observed in FIG. 13B do not become conspicuous. Therefore, the density nonuniformity is remarkably eliminated as compared to FIG. 13C, as shown in FIG. 14C.

Upon execution of such recording, image data is divisionally thinned out to predetermined complementary arrangements in the first and second scans. As the image data arrangement (thinning pattern), a checker pattern in which dots are printed on every other pixels in the vertical and horizontal directions is normally used, as shown in FIG. 15A. Therefore, a unit print area (in units of four pixels) is completed by the first scan for printing dots in a checker pattern and the second scan for printing dots in a reverse checker pattern.

FIGS. 15A, 15B, and 15C explain how to complete a predetermined record area using the checker and reverse checker patterns by the multi-head having eight nozzles like in FIGS. 12A to 14C. In the first scan, dots are recorded in a checker pattern  using lower four nozzles (FIG. 15A). In the second scan, a sheet is fed by four pixels (½ the head length), and dots are recorded in a reverse checker pattern  (FIG. 15B). Furthermore, in the third scan, the sheet is fed by four pixels (½ the head length), and dots are recorded in the checker pattern again (FIG. 15C). In this manner, when the paper feed operation in units of four pixels, and recording operations of the checker and reverse checker patterns are alternately performed, a record area in units of four pixels is completed for each scan.

As described above, since the print area is completed by two different groups of nozzles, a high-quality image free from the density nonuniformity can be obtained.

Such a recording method has already been disclosed in Japanese Laid-Open Patent Application No. 60-107975 and U.S. Pat. No. 4,967,203, and these references describe that this method is effective to remove the density nonuniformity and connection lines. The former reference discloses that "the invention is characterized by comprising means for forming an overlapping portion by overlapping two adjacent main scans by setting a paper feed width of each main scan to be smaller than the width of the main scan, and means for printing dots of the overlapping portion so as not to overlap each other in the two main scans". According to this reference, as described above, a thinning mask is defined as one for "alternately printing odd and even rows in every other columns" in one case. However, in another case, odd rows are printed in the first scan, and even rows are printed in the second scan. In still another case, odd and even rows are randomly printed in each scan. Thus, the thinning mask and the paper feed width are not completely limited.

In contrast to this, the latter U.S. Pat. No. 4,967,203 discloses that

"a) in the first pass, dots are printed at alternate pixel positions, which are not two-dimensionally adjacent to each other, of only the upper half of a first band, b) in the second pass, dots are printed on pixel positions, which are not printed in the first pass, in the first band, and at alternate pixel positions, which are not two-dimensionally adjacent to each other, in the lower half of the first band, and c) in the third pass, dots are printed at pixel positions, which are not printed in the first and second passes, in the first band, and at the same time, the first pass print operation in the next band is performed". In this manner, in this reference, a thinning mask used in divisional recording is limited to an alternate pixel arrangement in which pixels are not two-dimensionally adjacent to each other.

Such divisional recording is also effective for saving the power supply capacity for driving the head. When divisional recording is not performed, all the nozzles must be ready to perform recording in a 1-pixel width in the main scan direction. However, when the above-mentioned divisional recording is performed, the head need only be driven by an energy corresponding to half a total number of nozzles. Therefore, when a recording operation is to be completed in a single driving operation using all the nozzles in the head, the two-divisional recording requires only half a power supply capacity as compared to a case wherein no divisional recording is performed. Furthermore, even when the number of nozzles to be simultaneously driven is limited due to a limited power supply capacity, if a block arrangement in a block driving operation is designed in correspondence with a thinning mask used in divisional recording, the carriage speed can be increased.

However, even when the carriage speed is increased, since the divisional recording requires a plurality of carriage scans per unit area, the divisional recording requires considerable time cost per page, and the throughput is inevitably lowered. In this case, in order to shorten the print time, a method of reciprocally print-scanning a carriage is proposed. According to this method, since all carriage scans each for returning the carriage to the home position without performing any record operation after one record scan can be omitted, the record time per page can be reduced to almost half. In practice, the reciprocal print operation is popularly adopted as a monochrome print method. However, in a color ink jet apparatus having the arrangement of the present invention, the reciprocal print method is not put into practical applications yet for the following reasons.

FIG. 16 is a sectional view of a normally used recording ink and a landing state of the ink printed on a medium (paper sheet). FIG. 16 illustrates a state wherein two different color inks (dots) are absorbed (recorded) at almost neighboring positions to have a time interval therebetween. It is to be noted that, in an overlapping portion of two dots, the subsequently recorded dot tends to extend under the previously recorded dot in the sheet depth direction. Such a phenomenon is caused for the following reason. That is, in a process wherein a dyestuff such as a dye in the ejected ink is physically and chemically coupled to a recording medium, since the coupling capacity between the recording medium and the dyestuff is finite, the previously ejected ink dyestuff is preferentially coupled to the recording medium as along as there is no large coupling force difference depending on the types of dyestuffs, and remains in a large amount near the surface portion of the recording medium. Conversely, the subsequently ejected ink dyestuff is not easily coupled to the surface portion of the recording medium, and is fixed after it sinks deep in the sheet depth direction.

In this case, even when two different inks are printed at a single landing point, a priority color varies depending on the print order of the two different inks, and consequently, two different colors are expressed for visual characteristics of man. For example, assume that four color heads are arranged in the order of black, cyan, magenta, and yellow from the right, and main scans are performed by reciprocally moving the heads in the head alignment direction (right-and-left direction). In a forward scan, the heads are moved rightward, and simultaneously perform recording. At this time, since the recording order on a sheet surface follows the alignment order of the heads, for example, when a green (cyan+yellow) signal is input to a given area, inks are absorbed by each pixel in the order of cyan and yellow. Therefore, as described above, in this scan, the previously absorbed cyan serves as the priority color, and a cyanish green dot is formed. Conversely, in a backward scan after a paper feed operation is performed in the sub-scan direction, the four heads are located at the right side in FIG. 16, and perform recording while being moved in a direction opposite to the forward scan. Therefore, the print order is reversed, and in this scan, a yellowish green dot is formed. When such scans are repeated, cyanish green dots and yellowish green dots are recorded according to the forward and backward movements of the recording heads. If each scan does not use the divisional print method and the paper feed operation is performed by the head width after each of the forward and backward scans, a cyanish green area and a yellowish green area alternately appear by the head width, and a green image which should be a uniform image, is considerably deteriorated.

However, this defect can be slightly conquered using the conventional divisional recording method. In the divisional recording method, as has been described above with reference to FIGS. 15A to 15C, pixels (dots) are recorded half and half by the forward scan for printing cyanish green dots (FIG. 15A or 15C), and the backward scan for printing yellowish green dots (FIG. 15B). Therefore, the color tone of a given area is relaxed by the dots having the two different color tones.

The arrangement and effect of the above method have already been disclosed in U.S. Pat. No. 4,748,453. In this reference, although the paper feed amount is not limited, dots are complementarily recorded at two-dimensionally alternate pixel positions in two (first and second) or more record scans, thereby preventing beading of inks on a medium such as an OHP sheet. In addition, when a color image is formed, the ink landing order for color-mixed pixels is reversed between the first and second scans (reciprocal recording), thereby preventing color banding (color nonuniformity). Since this reference has as its principal object to prevent beading between neighboring pixels, it is characterized in that dots are recorded at two-dimensionally alternate (non-adjacent) pixel positions in a single scan.

Japanese Laid-Open Patent Application No. 58-194541 by the same applicant as the present invention discloses "a recording method wherein a plurality of recording element arrays are arranged parallel to each other, upon execution of a main scan for recording a dot matrix by reciprocally moving the recording element arrays in a direction perpendicular to the recording element arrays, dots fewer than all dots in at least one of rows and columns of the recording dot matrix are intermittently recorded in a forward main scan, and remaining dots in at least one of rows and columns of the recording dot matrix are intermittently recorded in a backward main scan, so that the forward and backward main scans have different overlay recording orders of overlay record dots using the plurality of recording element arrays". In this reference as well, there is no limitation such that the paper feed width is set to be smaller than a normal width unlike in the previously described divisional recording, and the effect of this reference is to prevent deterioration of image quality caused by color mis-registration (color non-uniformity) of a recorded image caused by overlay recording of color inks. Since this reference has as its principal object to prevent color mis-registration, dot positions to be recorded in each scan are not particularly limited. In the embodiments of this reference, a horizontal thinning pattern used for alternately recording dots in only the vertical direction, and a vertical thinning pattern alternately repeated in only the horizontal direction are described in addition to checker patterns (checker and reverse checker patterns).

Also, Japanese Laid-Open Patent Application No. 55-113573 discloses an arrangement for performing reciprocal recording using checker patterns (checker and reverse checker patterns) although it is not limited to a color printer. This reference inhibits continuous print operations of neighboring dots, thereby preventing a dot distortion caused by printing a neighboring dot before a previously printed dot is dried. Therefore, in this reference, a thinning mask is limited to a figured or twilled pattern like in U.S. Pat. No. 4,748,453.

The three references presented above have as their objects to prevent color nonuniformity and beading in reciprocal recording. Therefore, these references do not employ an arrangement in which "the paper feed amount between adjacent scans is set to be equal to or smaller than a normal head width", which arrangement is employed for the purpose of preventing the density nonuniformity caused by variations of nozzles, unlike in the divisional recording method described in this specification.

As described above, when the divisional recording method is adopted in reciprocal recording, since two different groups of record pixels formed in the opposite print orders of color inks can be uniformly arranged in a record area, it is expected that multi-color bi-directional recording, which easily causes color nonuniformity normally, can be realized.

However, even when the above-mentioned divisional recording shown in FIGS. 15A to 15C is performed, the defect of color nonuniformity is not perfectly removed yet. The reason for this will be described below. In general, the amount of an ink droplet is designed so that the ink spreads wider than an area for each pixel on a sheet surface. This is to eliminate any blank portion in an area corresponding to a print duty of 100%. Therefore, even when the divisional recording method is executed, although record pixels themselves are printed at only 50%, an almost 100% area of a recording medium (recording sheet) is covered by dots, as shown in FIG. 17. FIG. 18A is a sectional view of the sheet surface in this case. In FIG. 18A, a checker print operation is performed on a blank sheet in the first pass (forward scan), and a reverse checker print operation is performed in the second pass (backward scan). Reference numeral 2001 indicates a state of inks immediately after the print operation in the first pass (forward scan). In this state, a solid black portion represents a cyan ink, and a hatched portion represents a yellow ink. Since the yellow and cyan inks are printed at an identical position to have a very small time interval therebetween, when they are absorbed by the sheet, the cyan ink is less blurred in a high-density state, and the yellow ink is largely blurred to extend to portions under and around the cyan ink in a low-density state. Also, at this time, the absorbing range of these inks extends over neighboring pixel positions, and as shown in FIG. 17, almost the entire sheet surface is filled with the ink dots.

In the second pass (backward scan) performed under this condition, dots land on the sheet surface on which neighboring ink dots are absorbed, as indicated by reference numeral 2003. Since the second pass is a backward scan, the yellow ink is printed first, and the cyan ink is printed second (2002). When the inks are absorbed in this state, an absorbing state in which both the colors do not clearly appear on the surface is finally formed, as indicated by reference numeral 2003. In a completed image, the density of the cyan ink, which was printed first, is emphasized most strongly, and a green image having cyan as a priority color tone is formed on this print area. Conversely, in a print area which has a backward scan as the first pass, and is adjacent to the above-mentioned print area, the situations of the cyan and yellow inks are reversed, and a green image having yellow as a priority color tone is formed.

FIG. 19 illustrates a state wherein the above-mentioned two print areas appear. More specifically, green images having cyan as a priority color tone are formed on the first and third areas on a recording medium since the cyan ink is printed first in the first and third scans, and green images having yellow as a priority color tone are formed on the second and fourth areas since the yellow ink is printed first in the second and fourth scans. As can be seen from FIG. 19, the lower half nozzles of the heads determine the priority color of each area, and the priority color is reversed between the forward and backward scans. Since two areas having the different priority colors are alternately formed, color nonuniformity still appears in the divisional print method, and deteriorates an image, thus preventing practical applications of the reciprocal print operations.

Furthermore, the defect caused by blurring of an ink to the neighboring pixel position is observed not only as the color nonuniformity but also in monochrome reciprocal print operations. Such a defect will be explained below. FIGS. 20A to 20C show the absorbing state of a monochrome ink in the first and second passes like in FIGS. 18A and 18B. In FIG. 20A, a state 2101 represents a landing state immediately after the first pass print, and states 2102 and 2103 represent landing states after the second pass print when viewed in a sheet section. In the state 2102, the second pass print is performed immediately after the first pass print, and in the state 2103, the second pass print is performed after a certain delay time after the first pass print. These two states cause different absorbing states of the ink recorded in the second pass to the sheet surface. That is, in the state 2102, the ink is absorbed deep in the sheet depth direction, while in the state 2103, the ink printed in the second pass extends on the sheet surface. These states are also confirmed from the rear sheet surface side. That is, the ink in the state 2103 considerably penetrates the sheet to the rear surface side as compared to the state 2102. These states also appear as a density difference on the sheet surface (2104 and 2105).

The time interval generated by reciprocally scanning the carriage is sufficient with respect to the order of the time difference that causes the density difference between the above-mentioned states. This factor appears as a new defect upon execution of the reciprocal print operations. This defect will be described below with reference to FIG. 21.

In FIG. 21, the head performs a forward scan in the direction of an arrow from a position 2201 to perform recording corresponding to a first scan width. After the head performs recording for one line, a sheet is fed by a width ½ the scan width, and the head then performs a backward scan in the opposite direction in turn from a position 2202 shown in FIG. 21. Furthermore, after the sheet is fed by the same width as described above, the head performs the forward scan again from a position 2203 to perform recording in the direction of the arrow. Recording intervals of the second pass at positions ① to ⑥ of the print area completed at this time are compared. More specifically, at positions ③ and ④, after the first pass print is completed, the second pass print is performed immediately after the sheet is fed by a ½ width. In contrast to this, at positions ① and ⑥, after the first pass print, the second pass print is performed after an elapse of a time required for reciprocally scanning the carriage once. At positions ② and ⑤, the two print operations are performed at just an intermediate time interval. Therefore, as has already been described above with reference to FIGS. 20A to 20C, the positions ① and ⑥ have the highest density, the positions ② and ⑤ have the next highest density, and the positions ③ and ④ have the lowest surface density since the ink is absorbed deepest. Therefore, the density nonuniformity appears on the left-hand side area where the positions ① and ④ repetitively appear at an interval of the ½ width in the vertical direction, and on the right-hand side area where the positions ③ and ⑥ repetitively appear at the interval of the ½ width in the vertical direction, thus deteriorating image quality. Such a density nonuniformity caused by the carriage reciprocal scanning time, and regularly appearing in the paper feed direction will be referred to as a time interval nonuniformity hereinafter. As described above, the blurring state to non-print pixel positions in the first pass causes dependency of the density on the recording interval between the first and second passes, and it can be understood from this respect as well that actual applications of the reciprocal print method have been impossible so far. In the above description, monochrome recording has been exemplified. This phenomenon also appears together with color nonuniformity in mixed-color recording, as has already been described above, and in this case, it is recognized as right and left different color nonuniformity portions or different color tones.

In one-directional recording as well, the following factor is known as a defect influencing the recording time interval. When the recording apparatus performs a head recovery scan to maintain its own driving scans during recording or waits for transfer of record data, the carriage is temporarily set in a rest state. Such a rest state causes density nonuniformity which occurs irregularly on the order still larger than that of the time interval nonuniformity described above. More specifically, when the carriage is set in a rest state after the first pass print is completed, and the second pass print is performed after some time interval, a corresponding record area has a higher density than other areas. The density nonuniformity caused by such a factor will be referred to as rest nonuniformity to be distinguished from the time interval nonuniformity.

As described above, when the divisional recording or the bi-directional print method is realized to achieve high image quality and high-speed image formation in an ink jet recording apparatus for performing image formation by scanning recording heads in a direction different from the nozzle alignment direction of one head, image defects such as color nonuniformity, rest nonuniformity, and time interval nonuniformity remain unremoved.

SUMMARY OF THE INVENTION

The present invention has been made in consideration of the above situation, and has as its object to provide an improved ink jet recording method.

It is another object of the present invention to provide an ink jet recording method, which can record a high-quality image free from any density nonuniformity.

It is still another object of the present invention to provide an ink jet recording method, which can record a high-quality color image free from any color nonuniformity.

It is still another object of the present invention to provide an ink jet recording method, which completes recording of an area, which can be recorded in a single main scan, by performing a plurality of main scans while performing sub scans in a direction opposite to the normal sub-scan direction at a predetermined period.

It is still another object of the present invention to provide an ink jet recording method, which can prevent deterioration of image quality caused by a recording time interval between two adjacent main scans when recording of a predetermined area is completed by a plurality of main scans.

The above and other objects of the present invention will become apparent from the following description taken in conjunction with the accompanying drawings.

BRIEF DESCRIPTION OF THE DRAWINGS

FIGS. 13A to 13C are views showing a print state of an ink jet printer suffering from density nonuniformity;

FIG. 19 is a view for explaining conventional reciprocal divisional recording;

DETAILED DESCRIPTION OF THE PREFERRED EMBODIMENTS

Figure 1:
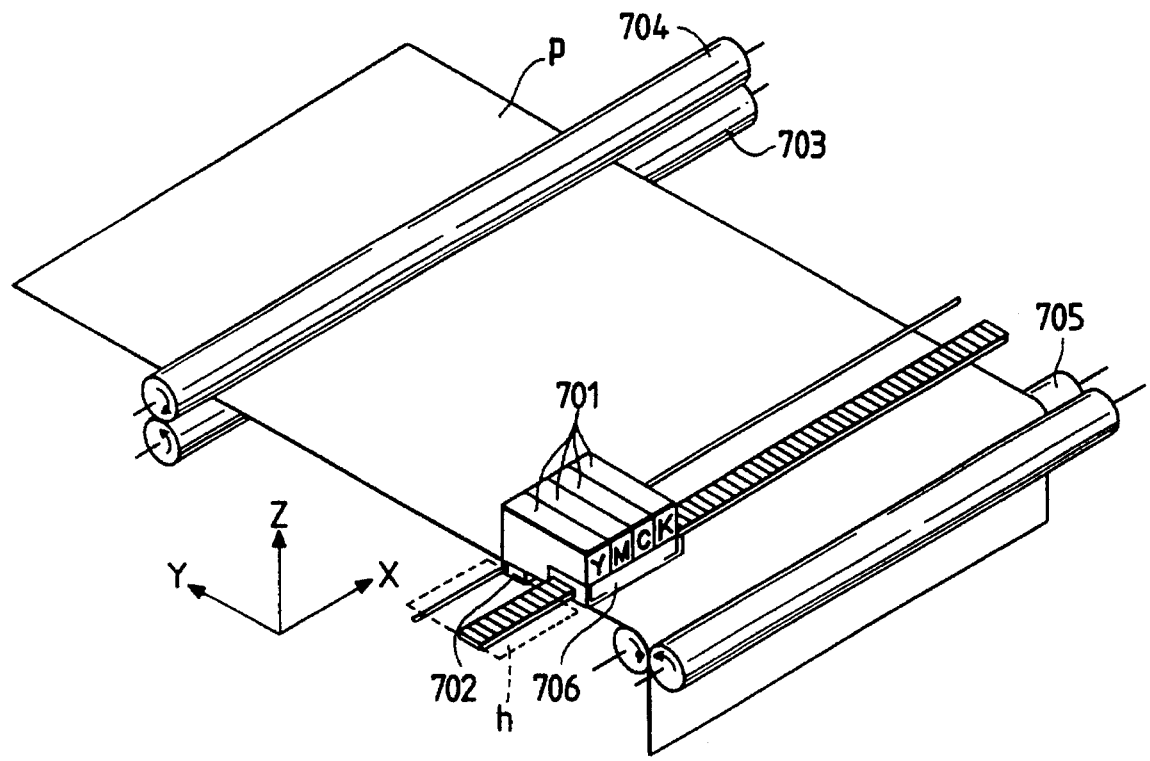
FIG. 1 is a schematic perspective view showing an arrangement of an ink jet recording apparatus to which the present invention can be applied.

The preferred embodiments of the present invention will be described in detail hereinafter with reference to the accompanying drawings. FIG. 1 is a schematic perspective view showing an arrangement of a color ink jet recording apparatus to which the present invention can be applied.

Figure 2:
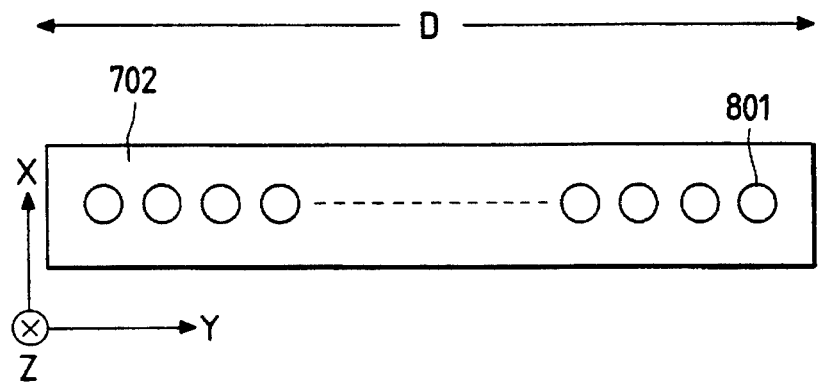
FIG. 2 is a plan view showing a recording head.

In FIG. 1 each of ink cartridges 701 is constituted by an ink tank for storing a corresponding one of four color inks, i.e., black (K), cyan (C), magenta (M), and yellow (Y) inks, and a multi-head 702 corresponding to one of these colors. FIG. 2 shows the state of multi-nozzles aligned on each multi-head when viewed from the Z-direction. In FIG. 2, multi-nozzles 801 are aligned on the multi-head 702.

In FIG. 2, the multi-nozzles 801 are aligned parallel to the Y-axis. However, the multi-nozzle array may be slightly inclined on the X-Y plane in FIG. 2. In this case, when the head is moved in the moving direction X, the nozzles perform print operations while shifting their timings.

Referring back to FIG. 1, a paper feed roller 703 is rotated in the direction of an arrow in FIG. 1 together with an auxiliary roller 704 while pressing a print sheet P, thereby feeding the print sheet P in the Y-direction. Sheet supply rollers 705 are used for supplying the print sheet, and also serve to press the print sheet P in the same manner as the paper feed roller 703 and the auxiliary roller 704. A carriage 706 supports the four ink cartridges, and moves these cartridges along with a print operating. When no print operation is performed, or when a recovery operation of the multi-heads is to be performed, the carriage 706 waits at a home position h indicated by a dotted line in FIG. 1.

In this embodiment, the recording head of each ink jet cartridge ejects ink droplets by causing a change in state in the ink using heat energy.

The four ink jet cartridges carried on the carriage 706 are aligned to overlay inks in the order of black, cyan, magenta, and yellow inks in the forward movement of the carriage. Therefore, in the backward movement of the carriage, the inks are overlaid in the order opposite to that in the forward movement. An intermediate color can be realized by properly overlaying C, M, and Y color ink dots. More specifically, red can be realized by overlaying M and Y, blue can be realized by overlaying C and M, and green can be realized by overlaying C and Y.

In general, black can be realized by overlaying three colors, i.e., C, M, and Y. However, in this case, black has poor color development characteristics. Since it is difficult to overlay these colors with high precision, a chromatic edge is formed around a black dot. In addition, an ink print density per unit time becomes too high. For these reasons, the black ink is independently ejected.

Figure 3:
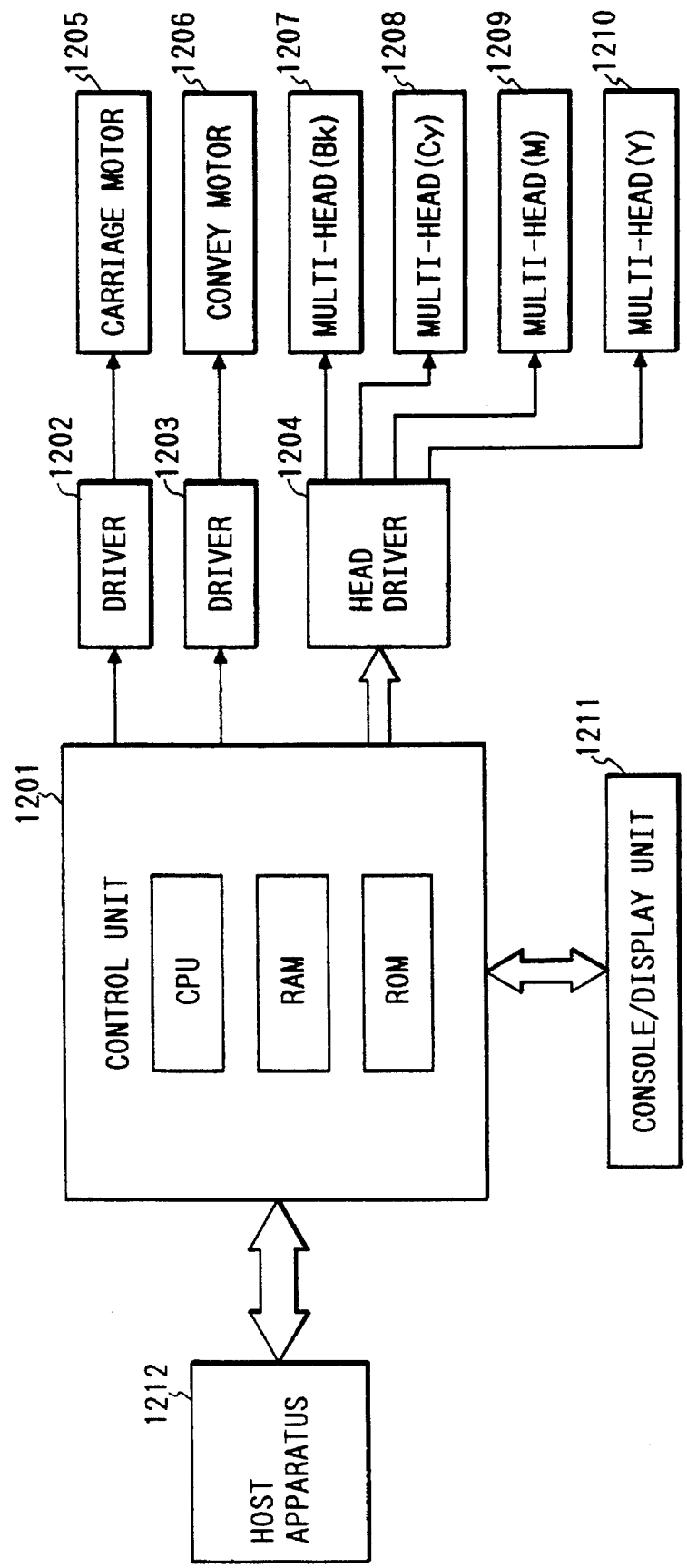
FIG. 3 is a block diagram showing a control unit of the ink jet recording apparatus shown in FIG. 1.

FIG. 3 is a block diagram showing a control unit of the ink jet recording apparatus shown in FIG. 1. In FIG. 3, a control unit 1201 is mainly constituted by a CPU, a ROM, a RAM, and the like, and controls the respective sections of the apparatus according to a program stored in the ROM. A driver 1202 drives a carriage motor 1205 for moving (main-scanning) the carriage 706 in the X-direction on the basis of a signal from the control unit 1201. A driver 1203 drives a convey motor 1206 for conveying (sub-scanning) a recording medium in the Y-direction by driving the sheet supply rollers 705 and the paper feed roller 703 on the basis of a signal from the control unit 1201. A driver 1204 drives color multi-heads 1207 to 1210 (corresponding to the heads 702 in FIG. 1) on the basis of print data from the control unit 1201. A console/display unit 1211 is used for performing various key inputs and various displays. A host apparatus 1212 supplies print data to the control unit 1201.

When a print start command is input, the carriage 706, located at an illustrated position (home position) in FIG. 1 before a print operation is started, performs a print operation in units of record sections on the sheet surface using the n multi-nozzles 801 of the multi-heads 702 while being moved forward in the x-direction. When the data print operation up to the sheet surface end portion is completed, and the carriage reaches a reverse position, the carriage then starts backward movement toward the home position, and performs a data print operation again. During a time interval after the first print operation by the forward movement of the carriage is completed until the second print operation by moving the carriage backward is started, the sheet is fed in the Y-direction according to the width of the divided record section by rotating the paper feed roller 703 in the direction of the arrow. In this manner, when the print operation using the multi-heads and the paper feed operation (sub-scan) are repetitively executed, data is printed on one sheet surface.

Embodiments of a recording method executed by the ink jet recording apparatus with the above-mentioned arrangement will be described hereinafter.

(First Embodiment)

Figure 4:
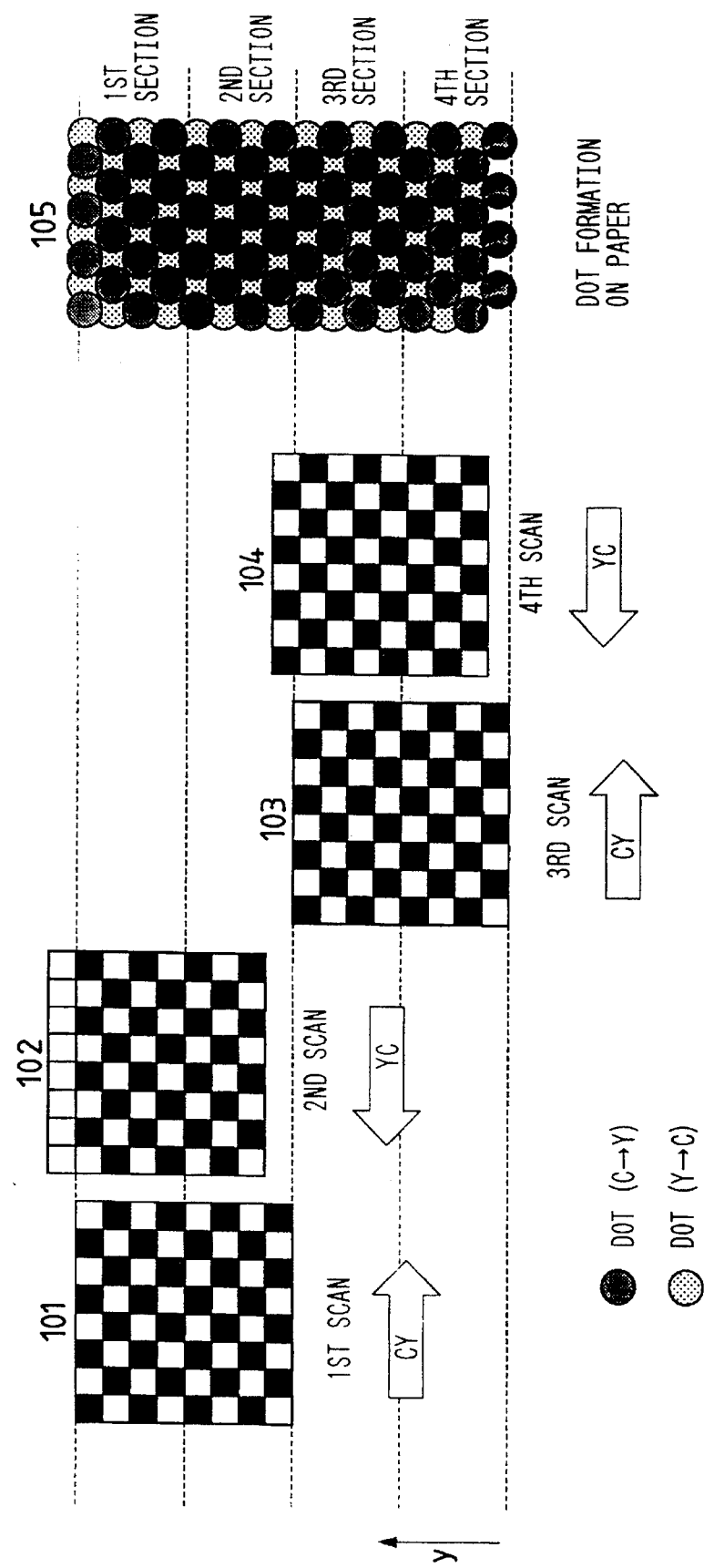
FIG. 4 is a view for explaining a recording method of the first embodiment.
Figure 17:
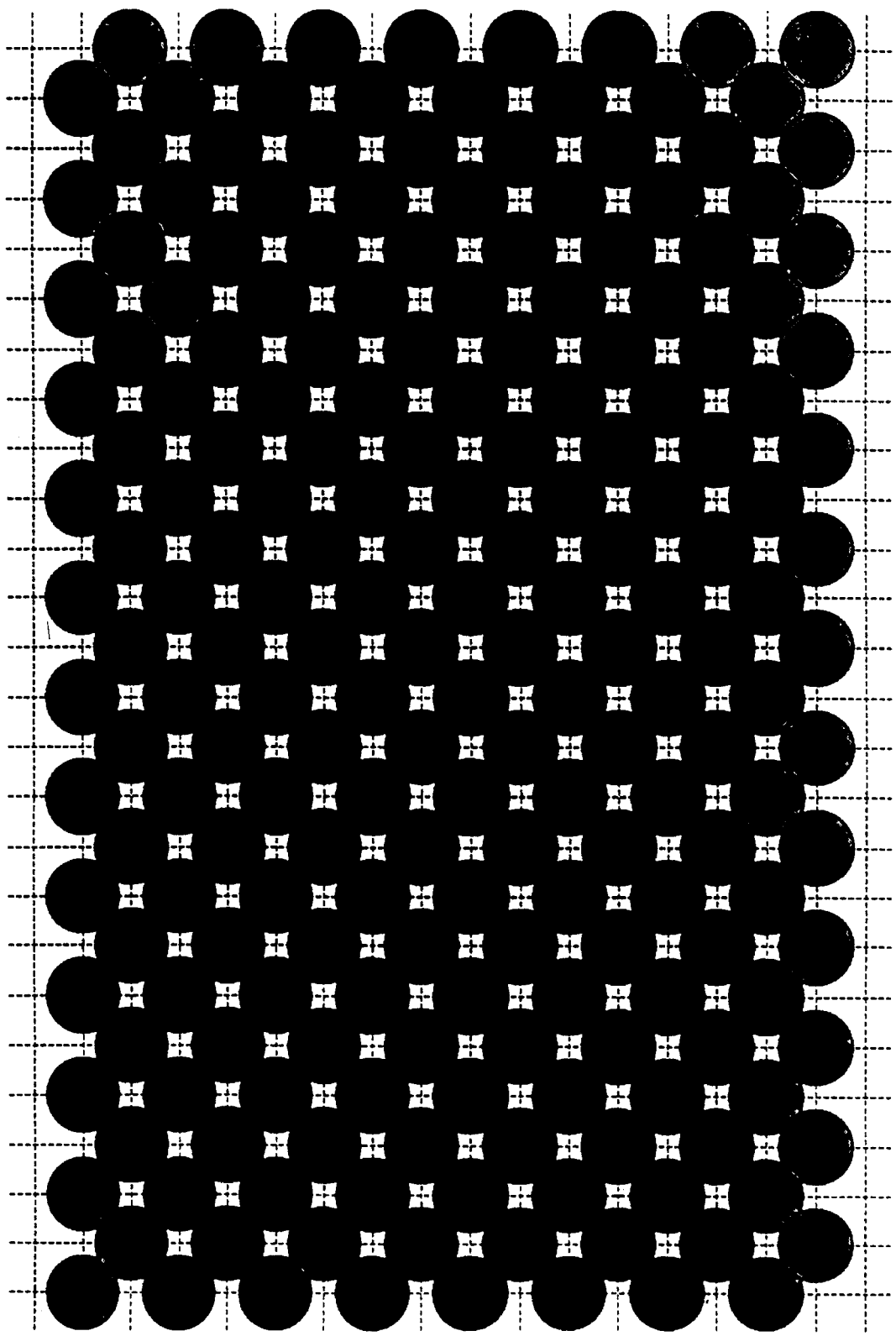
FIG. 17 is a view showing a print state obtained when an arrangement pattern formed by thinning out pixels in a non-neighboring checker pattern is used.
Figure 18A:
FIGS. 18A and 18B are views for explaining a defect of color nonuniformity.
Figure 18B:
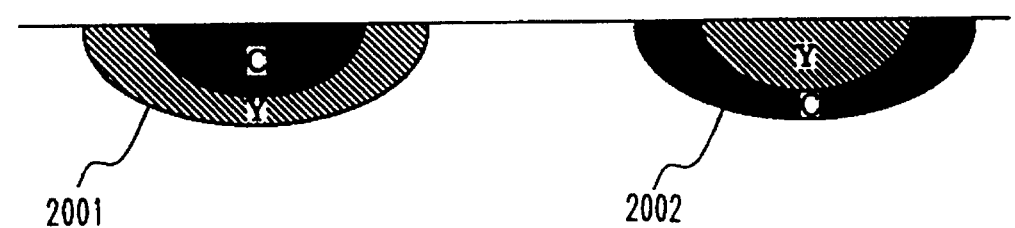
Figure 20A:
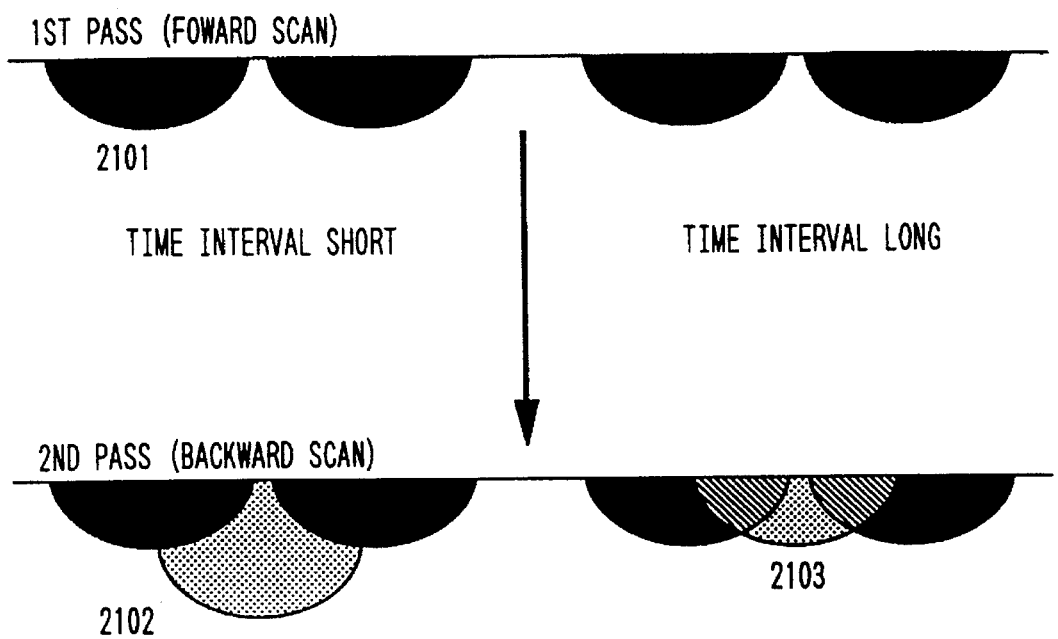
FIGS. 20A to 20C are views for explaining a defect of reciprocal time interval nonuniformity.
Figure 20B:
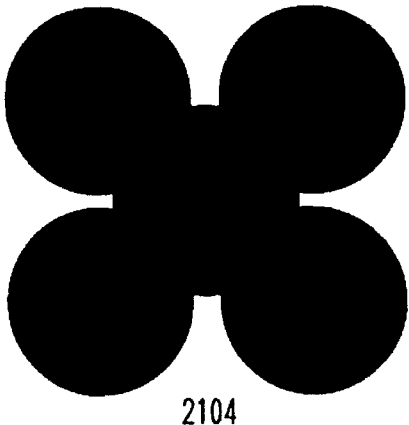
Figure 20C:
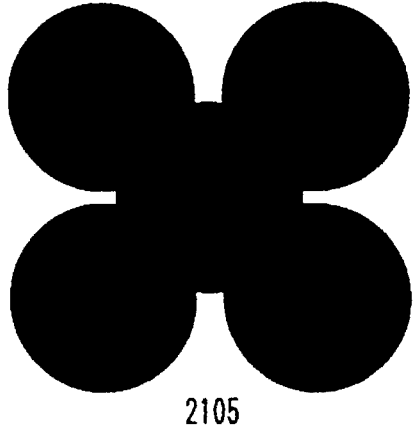

The first embodiment of the present invention will be described below. FIG. 4 best illustrates the present invention in comparison with FIG. 19, and shows the recording method of this embodiment. FIG. 4 shows a state wherein a CY image is recorded using 8-nozzle heads as in FIG. 19 for the sake of simplicity. According to this embodiment, the carriage 706 carrying the recording heads is moved forward in the direction of an arrow, thereby recording dots on pixels (black) arranged in a checker state 101 while being moved in the direction of the arrow (first scan). At this time, since the recording heads are aligned in the order of K, C, M, and Y with respect to the carriage moving direction, inks land on the pixels in the order of C→Y, and consequently, a dot on each pixel has a strong cyan color tone, as has already been described above. Furthermore, since an ink dot in each pixel is blurred to extend to neighboring pixel positions, as shown in FIG. 17, the entire section has a strong cyan color tone. The paper feed roller then performs a paper feed operation by one pixel in a direction opposite to the normal paper feed direction (i.e., in the y-direction in FIG. 4). Therefore, the recording heads are located at a position corresponding to a print state 102 in FIG. 4 with respect to the y-direction of the record section on the sheet surface. From this state, the recording heads perform a backward print operation in turn in the direction of an arrow (second scan). At this time, the ink print order is reversed, and the inks are recorded in the order of Y→C. For this reason, a landing point having a strong yellow tone color should be obtained on each pixel. However, in practice, since recording in the backward scan is performed only on a section which has already been subjected to recording in the forward scan, dots are recorded in a state indicated by 2002 and 2003 in FIGS. 18A and 18B. For this reason, ink dots recorded in the backward scan extend under the ink dots recorded in the forward scan. At this time, the nozzles (seven nozzles in FIG. 4) other than nozzles at the rear end position when viewed from the positive recording direction (−y direction) record dots on a section which was subjected to recording in the previous forward scan, but the nozzles at the rear end position record dots on a section which was subjected to recording not in the previous forward scan but in the second previous forward scan. Or, if this section corresponds to a portion at the beginning of the record section on the sheet surface, the nozzles at the rear end position do not perform recording. Therefore, since the entire section subjected to recording in this backward scan is completed in this backward scan, the color tone of this color is similar to that (cyan) recorded in the first pass, i.e., the forward scan. When the next forward scan is to be performed, a paper feed operation is performed by the total number of heads+one pixel in the positive direction, i.e., the heads are waited at a position corresponding to a print state 103 in FIG. 4. Then, the next forward scan is performed, as has been described above.

When recording is completed by a series of scans described above, a recorded image having an equal tone color on all sections can be finally obtained, as shown in FIG. 4.

According to this method, since the ink print order on record sections is not reversed unlike in FIG. 19, and inks are printed on all record sections in an equal print order especially from a blank sheet state, an equal color tone can be obtained. According to this method, since recording is completed by two adjacent nozzles in the main scan direction of all nozzles, the same effect of preventing a density nonuniformity caused by nozzle variations described above as in the conventional divisional recording can be obtained. Furthermore, according to this embodiment, the total paper feed distance is increased since a paper sheet is returned by a one-nozzle width per scan. However, since the number of times of paper feed operations itself is the same as that in normal scans, the increase in paper feed distance does not add time cost to a degree which interferes with practical applications. Conversely, since this method allows bi-directional recording, the throughput can be remarkably increased as compared to a normal one-directional divisional recording.

Figure 21:
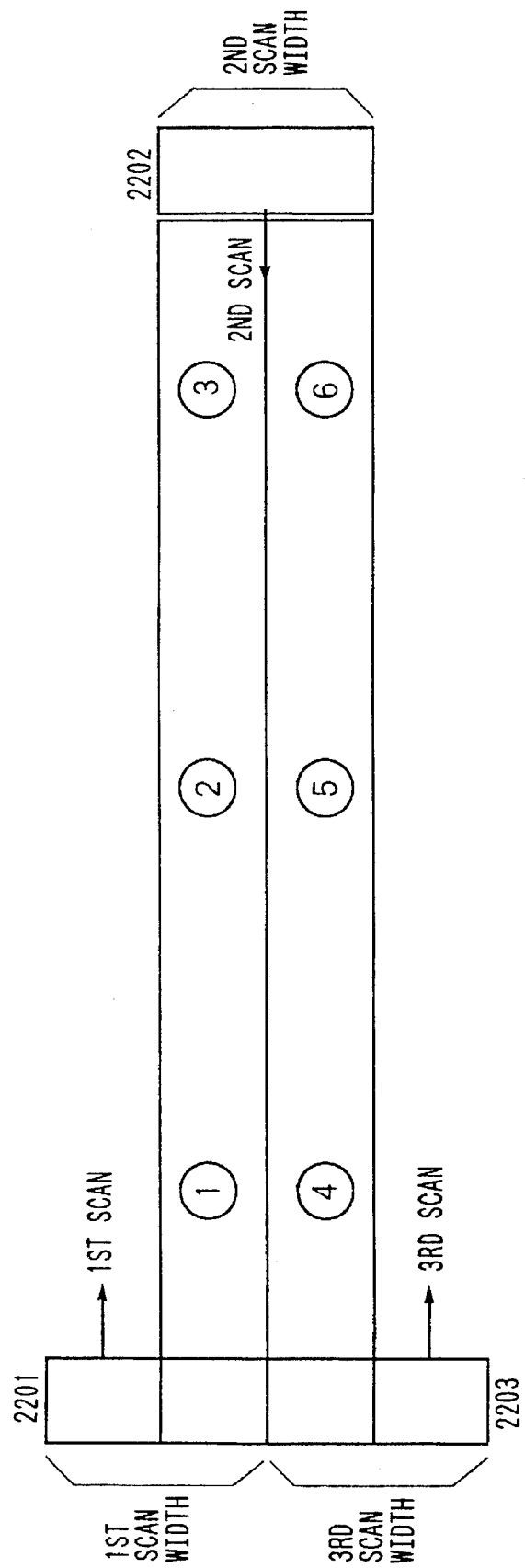
FIG. 21 is a view for explaining a recording time interval in reciprocal divisional recording.

Furthermore, according to this embodiment, the time interval nonuniformity and rest nonuniformity as defects in the bi-directional recording can be effectively removed. As for the time interval nonuniformity described above with reference to FIG. 21, sections juxtaposed in units of equal widths make the density nonuniformity conspicuous. However, according this embodiment, except for a 1-pixel width section recorded at a timing different from other sections, dots are recorded at an equal timing on almost neighboring sections sandwiching the 1-pixel width section therebetween. For this reason, a regular density nonuniformity in the paper feed direction observed in the prior art does not appear. The same applies to the rest nonuniformity. If the carriage is stopped after the end of the backward scan or recording, a high-density portion formed when the carriage is stopped can be removed, and a uniform image can be obtained.

As described above, in divisional bi-directional recording, before the backward scan is performed, a paper sheet is fed by a −1-pixel width, and before the forward scan is performed, the paper sheet is fed by a (number of nozzles+one pixel) width, thereby obtaining a high-quality, smooth image free from the color nonuniformity, time interval nonuniformity, and rest nonuniformity.

In this embodiment, the −1-pixel width and the (number of nozzles+one pixel) width are used as the sub-scan amounts. However, a −n-pixel width (n≧2) and a (number of nozzles+n pixels) width may be used as the sub-scan widths. For example, the feed amount may be increased by the number of pixels, which allows to completely eliminate a nozzle nonuniformity.

(Second Embodiment)

Figure 5:
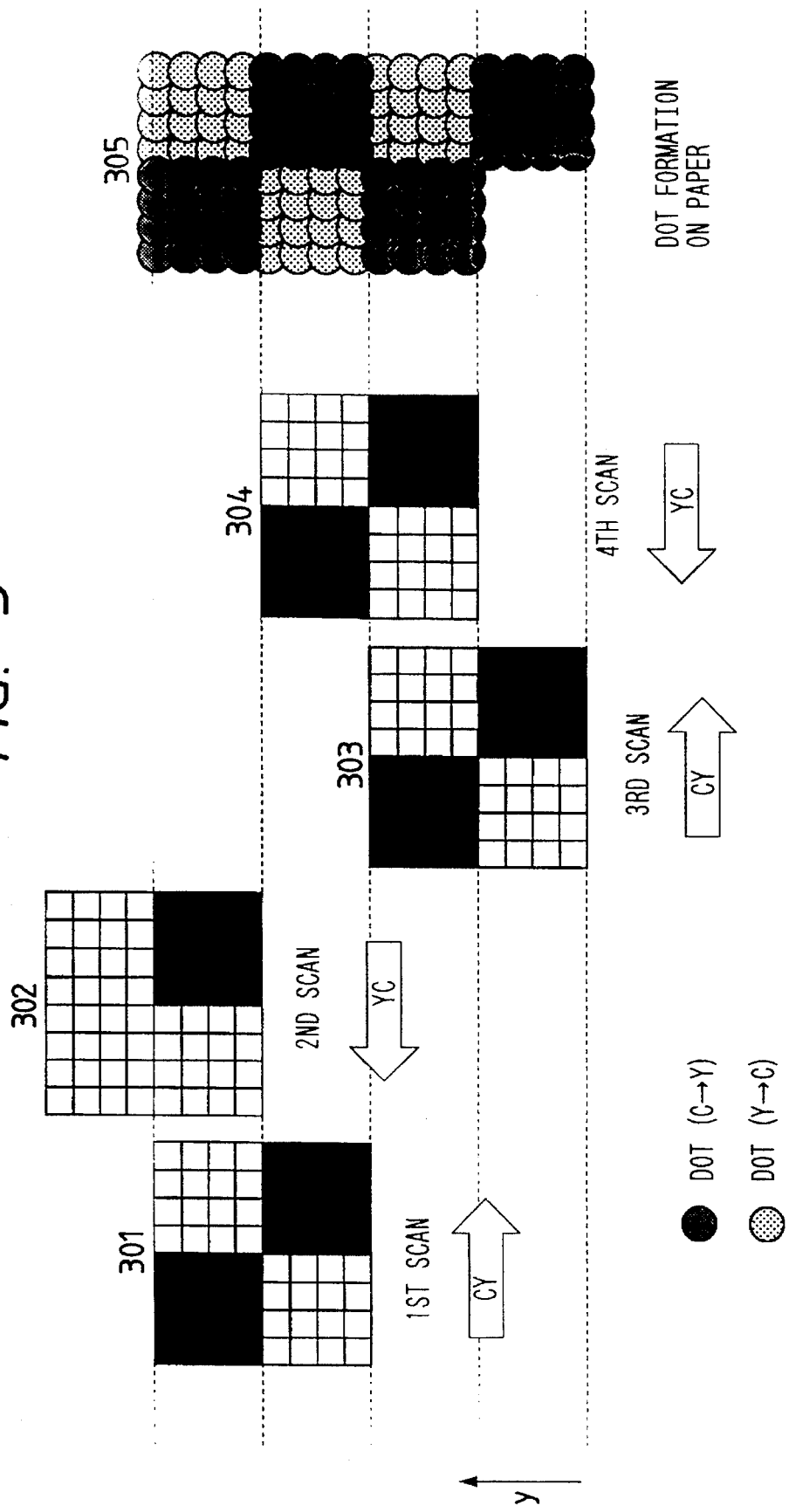
FIG. 5 is a view for explaining a recording method of the second embodiment.
Figure 7:
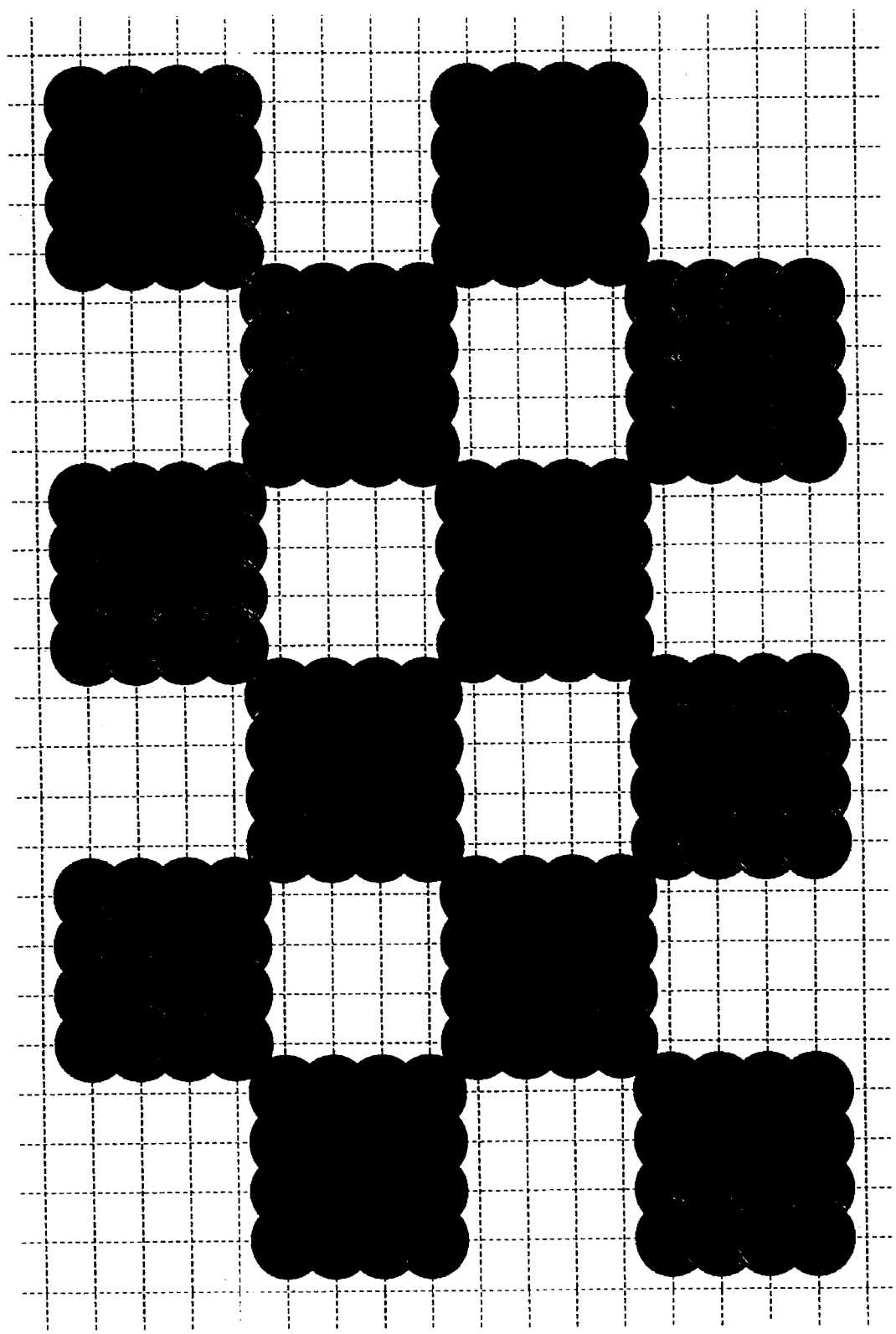
FIG. 7 is a view showing a recording state in the second embodiment.

The second embodiment of the present invention will be described below. This embodiment adopts a different thinning arrangement in divisional recording from that of the first embodiment. FIG. 5 shows the recording method of this embodiment as in FIG. 4. In this embodiment, a pixel group consisting of 4×4 pixels in the vertical and horizontal directions is defined as one unit, and adjacent pixel groups are inhibited from being recorded in a single scan. In this manner, as is apparent from a comparison between FIGS. 7 and 17, the dot coverage on the record section per scan changes. In FIG. 17, dots are independently arranged at non-neighboring positions, while in FIG. 7, dots overlap each other in each 4×4 dot group, thus decreasing blurring of inks to a blank sheet portion, and the dot coverage accordingly. Therefore, the area of the sheet surface on which dots land in the next scan in FIG. 7 is larger than that in FIG. 17. Since the first embodiment adopts the dot arrangement shown in FIG. 17, the color tone in the first scan becomes a priority color as compared to the color tone in the second scan on every section. In contrast to this, in this embodiment, the record section on a blank sheet in the backward scan is increased in area, and an average tone color of the scans, i.e., a color approximate to a color to be expressed, can be obtained as a whole.

In this embodiment, the paper feed return width is set to be a 4-nozzle width, i.e., a 1-pixel group width. With this method, since connection lines in units of paper feed operations are dispersed in the vertical direction, as indicated by black lines in a state 305 of FIG. 5, they are not conspicuous as compared to horizontally continuous connection lines shown in FIG. 4, and a smoother image can be obtained. In particular, when a special paper feed operation is performed like in the present invention, the remaining pixel width portion after the paper feed operation in the "−" direction has a longer recording interval between the first and second scans by one scan of the carriage than other sections, and causes the above-mentioned rest nonuniformity. As a result, an especially conspicuous connection line tends to be formed. In this respect as well, the effect of this embodiment, which can eliminate blurring to a blank sheet section, is remarkable.

Another effect of this embodiment will be described below. Basically, the effect of the divisional recording method cannot be obtained unless record pixels in a unit section are almost equally recorded in two scans. In the examples described so far, since an image to be recorded has a duty of 100%, the same number of pixels are recorded in two passes in either of this embodiment or the prior art. However, most of image data are sent as actual signals after multi-value data representing certain gradation levels are binarized by a predetermined binarization method to have a predetermined pattern.

Figure 6:
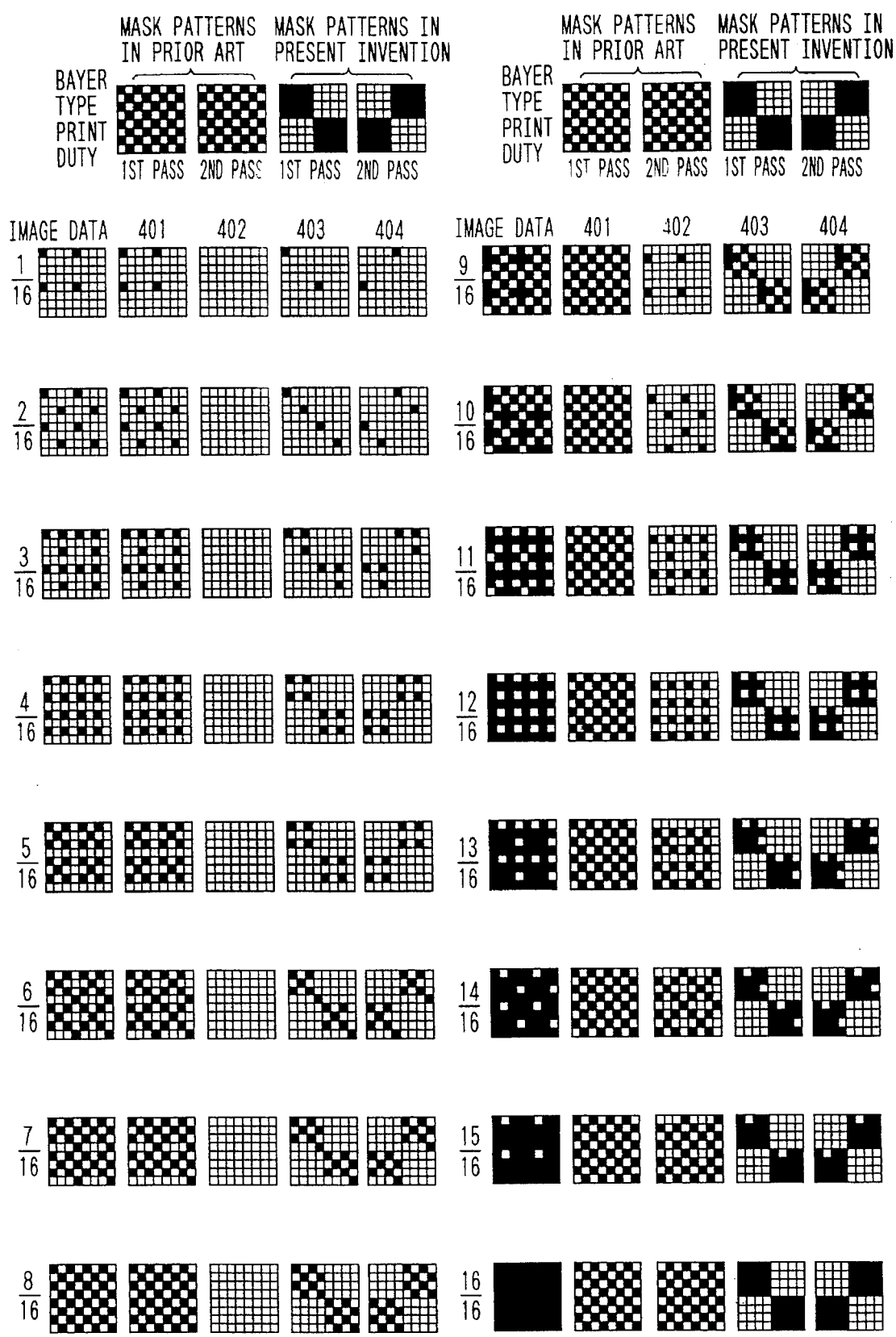
FIG. 6 is a view for explaining the relationship between binarized data by a dither method, and conventional divisional recording and divisional recording according to the second embodiment.

This embodiment is effective for a dither method, which is popularly used as the binarization method. FIG. 6 shows an example of the dither method. In FIG. 6, a bayer type dither method is used as the binarization method. FIG. 6 shows how to distribute image data to two passes upon comparison between the conventional divisional recording method and the divisional recording method of this embodiment when images whose duties are increased in units of $1/16$ ($4/64$) are input to an 8×8 area. In patterns 401 and 402, record pixels respectively allowed in the first and second scans of the conventional divisional recording method are indicated by black dots. Similarly, patterns 403 and 404 show record pixels according to the divisional recording method of this embodiment. When binarized image data shown on the left-hand side of patterns is input, patterns on the right-hand side of the data indicate pixels to be recorded in two scans of the two recording methods. As can be seen from FIG. 6, in the conventional divisional recording method, a print operation is completed by one scan alone up to $\%_{16}$, i.e., a duty of 50%. Even after the duty exceeds 50%, the numbers of record pixels in two passes are largely unbalanced, and the two passes have the same numbers of pixels only when the duty reaches 100%. In this case, at a low duty equal to or lower than 50%, data for one pixel width in the main scan direction of the head are recorded by the same nozzle, and the above-mentioned original object of the divisional recording method cannot be achieved at all, i.e., density nonuniformity caused by nozzle variations cannot be removed. The numbers of record pixels in the first and second scans are still unbalanced even in a high-duty area where duty exceeds 50% ($\%_{16}$), and as compared to this embodiment wherein the numbers of record pixels in two scans are equalized at any duty, an image is expected to deteriorate in terms of the density nonuniformity. This problem is posed not only in the bi-directional print mode but also in the one-directional print mode.

As a problematic phenomenon caused by the same cause as described above, i.e., the unbalanced numbers of record pixels in two scans, when recording is performed using two color inks having different duties, color nonuniformity caused by the ink landing order described in the prior art occurs in addition to the density nonuniformity. This problem, although not described in detail here, is a phenomenon which also occurs in the one-directional print mode like the density nonuniformity caused by nozzle variations, and can be solved as long as the same numbers of record pixels are equally distributed to the two passes.

For these reasons, when divisional printing is performed, the numbers of pixels to be recorded in record scans must always be equally distributed. The method of this embodiment is often effective in this respect not only for the bayer type method shown in FIG. 6 but also for other dither methods. This is for the following reason.

In binarization methods such as dither methods, a unique pixel arrangement is determined by each method (not limited to the bayer method) in a predetermined (e.g., 4×4 or 8×8) square area in correspondence with the duty. Even in an 8×8 matrix, a 4×4 matrix is often used as a submatrix, and the submatrices are two-dimensionally juxtaposed two by two, as shown in FIG. 6. This matrix is used for realizing area gradation therein, and is designed to always output an equal pixel arrangement if equal data is input. For example, in the case of the bayer type method shown in FIG. 6, pixel arrangements shown at the left end of FIG. 6 are determined to have a one-to-one correspondence with respective gradation levels. Therefore, when equal image data are input to all matrices like in recording of a uniform pattern, all the matrices two-dimensionally arranged on a recording image record dots in equal pixel arrangements, and form uniform images. These plurality of arranged matrices are equivalent to each other, and have the same number of dots at all duties. In a submatrix, although the number of dots at all duties are not always equal to each other, dot arrangements are distributed so as to minimize the unbalance of the numbers of dots.

In this embodiment, the matrix or submatrix is not entirely included in 4×4 dot groups, and neighboring matrices or submatrices can be prevented from being recorded in a single record scan. Therefore, since the same number of record data having equal arrangements are input to respective matrices for image data at any duty, the numbers of dots in units of record scans have no difference therebetween. In this respect, this embodiment is effective for various binarization methods.

In the above description, a 4×4 square mask is used as the shape of the mask. For example, this embodiment is also effective for a 4×3 rectangular mask. As has been described above, the mask having a 4-pixel width in the main scan direction is particularly effective for the binarization methods. However, like in a 4×3 pixel mask, when the mask has an odd-number pixel width such as three pixels, five pixels, or the like in the main scan direction, dots aligned in the main scan direction are recorded by two different nozzles even at any low duty. Like in a mask having a 4-pixel width in the main scan direction, when a mask includes one period (four pixels in FIG. 6) of a unit matrix for performing gradation expression, the number of pixels to be recorded in two scans in the main scan direction is always equally divided into two scans. However, for example, at a $\frac{1}{64}$ duty at which only one pixel in an 8×8 matrix is recorded, all pixels aligned in the main scan direction are recorded in a single record scan using one nozzle if this thinning mask is used. In contrast to this, the thinning mask having a 3-pixel width in the main scan direction is asynchronous with the period of a unit matrix, normally having a $2^n$ period, for gradation expression, and can always record pixels using two different nozzles at any duty.

Also, the thinning mask may have various numbers of pixels in the sub-scan direction. In order to realize the effect of the calculated extension rate on the entire area, and to equalize connection portions in units of scans to other portions, the number of nozzles of the recording head must always be dividable by the number of pixels in the sub-scan direction. When the number of nozzles of the recording head is as small as, e.g., eight nozzles, the number of pixels is set to have an upper limit. Since the present invention cannot be achieved unless at least two pixel groups are present in eight nozzles, a maximum of four pixels are determined as an upper limit.

In this manner, as thinning patterns for realizing this embodiment, various patterns including various numbers of pixels in the main scan direction, various numbers of pixels in the sub-scan direction, various total numbers of pixels in masks, and various mask shapes are available according to recording conditions and various requirements.

In this embodiment as well, the rest nonuniformity caused by a head recovery operation or a data waiting state can be removed by the same method as in the first embodiment. More specifically, if it is determined that the carriage is stopped after the end of the backward scan or recording, a high-density portion formed when the carriage is stopped can be removed, and a uniform image can be obtained.

As described above, according to the present invention, in the divisional bi-directional recording using a divisional thinning arrangement defined by arranging 4×4 pixel groups in a checker pattern, a paper sheet is fed by a −4-pixel width before the backward scan is performed, and is fed by a (number of nozzles+4 pixels) width before the forward scan is performed, thereby obtaining a high-quality, smooth image free from the color nonuniformity, time interval nonuniformity, and rest nonuniformity.

(Third Embodiment)

As the third embodiment, an application of the present invention to 4-pass recording will be described below. FIG.

Figure 8:
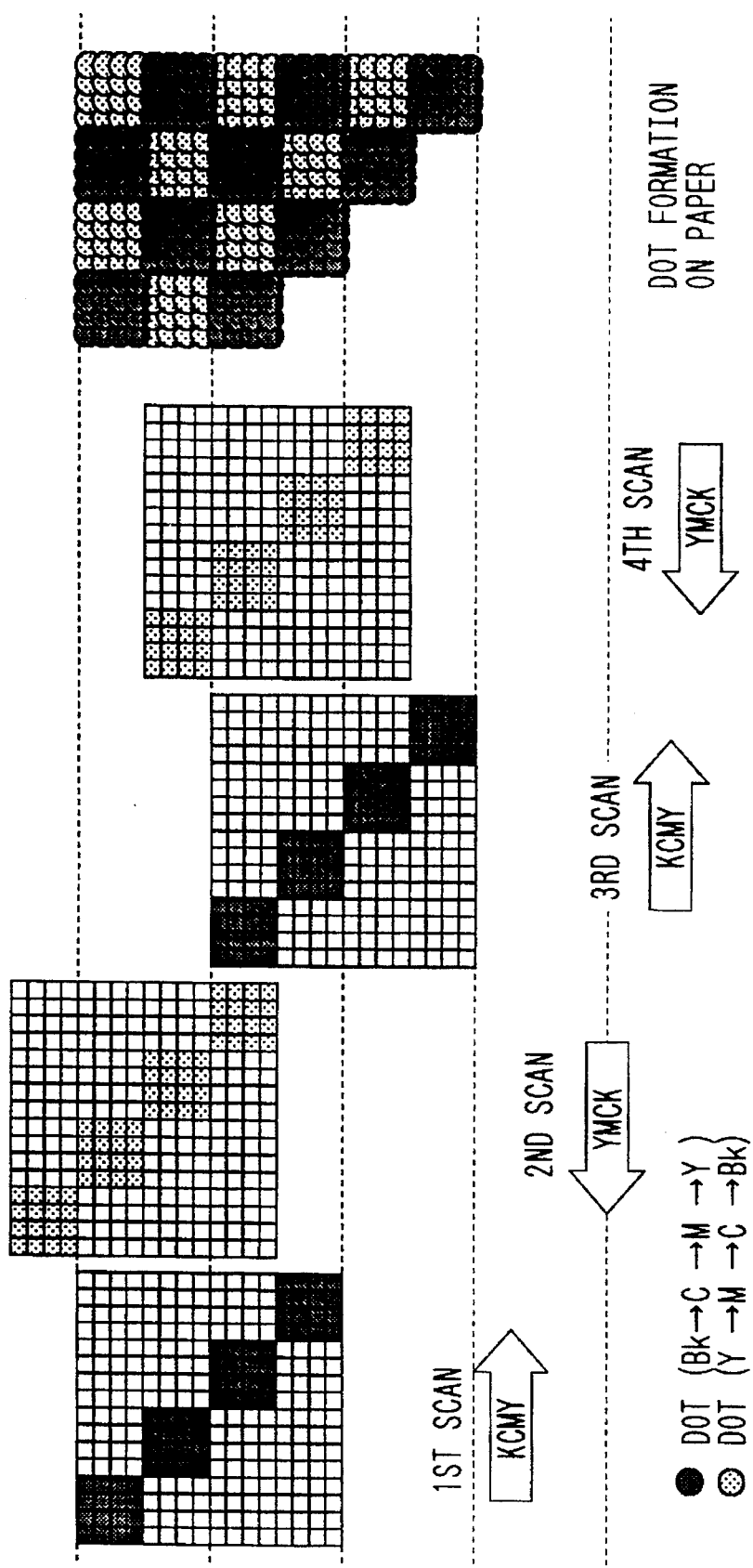
FIG. 8 is a view for explaining a recording method of the third embodiment.

8 shows a recording state of this embodiment by recording heads each having 16 nozzles. A 4×4 mask used in the second embodiment is equally divided by four passes to complete recording of an image, as shown in FIG. 8. Since dots are recorded in the order of KCMY, YMCK, KCMY, and YMCK on all record sections, no color nonuniformity occurs like in the above embodiment.

A dark illustrated portion in FIG. 8 corresponds to a connection portion between the first and fourth scans or between the previous third scan and the current second scan. Since two record scans are performed between these scans, high-density connection portions may appear at the illustrated positions. However, such connection lines appear not as lines in units of head widths in the head scan direction in FIG. 4 of the first embodiment or FIG. 5 of the second embodiment, but as a stepwise pattern on the entire area, as shown in FIG. 8. Therefore, such lines do not adversely affect an image as connection lines, and this embodiment can be expected to have higher image quality than the above embodiments.

This embodiment is also effective for the time interval nonuniformity. Since recording is started from the print order of KCMY of the forward scan on any record area, time intervals between the first and second scans and between the third and fourth scans are long at the left-hand side of the print area, and time intervals between the second and third scans, and between the fourth scan and the next first scan are long at the right-hand side of the print area. Therefore, since adjacent record areas in the direction perpendicular to the record scan directions are always subjected to recording under equal conditions, no time interval nonuniformity described above with reference to FIG. 21 occurs.

Furthermore, the rest nonuniformity can be suppressed if a rest state is set after the second or fourth scan. Although the time interval slightly influences connection portions emphasized as original high-density portions in FIG. 8, such an influence does not disturb a normal recording sequence, and a better image can be expected than the first and second embodiments.

Also, this embodiment is more effective for the nozzle nonuniformity than the first and second embodiments. As has been described above in the second embodiment, binary data can be equally recorded in each path using a 4×4 thinning mask. In the second embodiment, a dot array aligned in the main scan direction is always recorded by two different nozzles, while in this embodiment, the dot array is recorded by four different nozzles. Therefore, the density nonuniformity caused by nozzle variations can be reduced to ¼, and a smoother image can be obtained.

In addition, this embodiment can also be applied not only to a 4×4 mask but also to a 4×3 mask for the same reason as that described in the second embodiment.

This embodiment is further effective for the power supply capacity for driving the heads. In this embodiment, since only a maximum of four nozzles (¼ of the total number of nozzles) perform recording, recording can be performed at a normal speed by only a power supply capacity capable of driving four nozzles at the same time. In particular, in this embodiment, when continuous four nozzle groups are determined as one block, and are arranged to be always driven at the same time, recording of a 1-pixel width in the main scan direction can be completed by only one driving operation. Therefore, with the same power supply capacity, the first or second embodiment requires a driving time corresponding to at least two scans at an identical head position. However, even if the power supply capacity remains the same, this embodiment requires only a driving time corresponding to one scan to start recording of the next pixel continuous in the main scan direction. For this reason, even in divisional recording in which the entire throughput is normally decreased as the number of divisions is increased, when the heads are efficiently driven like in this embodiment, the power supply capacity can be saved or the throughput can be improved if the power supply capacity is fixed.

As for recording with heads which are moving at a constant speed, the method of this embodiment is effective for preventing a dot shift. Since the heads are moving at a constant speed, and temporally shifted driving operations are performed in units of blocks, a slight dot shift tends to normally occur between adjacent blocks. However, when recording is completed by a single simultaneous driving operation per one-nozzle width in the main scan direction like in this embodiment, a temporal shift factor between adjacent blocks can be removed, and high-precision, high-quality recording free from any dot shift can be expected.

As described above, when 4-pass recording shown in FIG. 8 is performed, a high-quality image free from the color nonuniformity, time interval nonuniformity, rest nonuniformity, and nozzle nonuniformity can be obtained in a state with a small power supply capacity for driving the heads and a high throughput.

(Fourth Embodiment)

Figure 9:
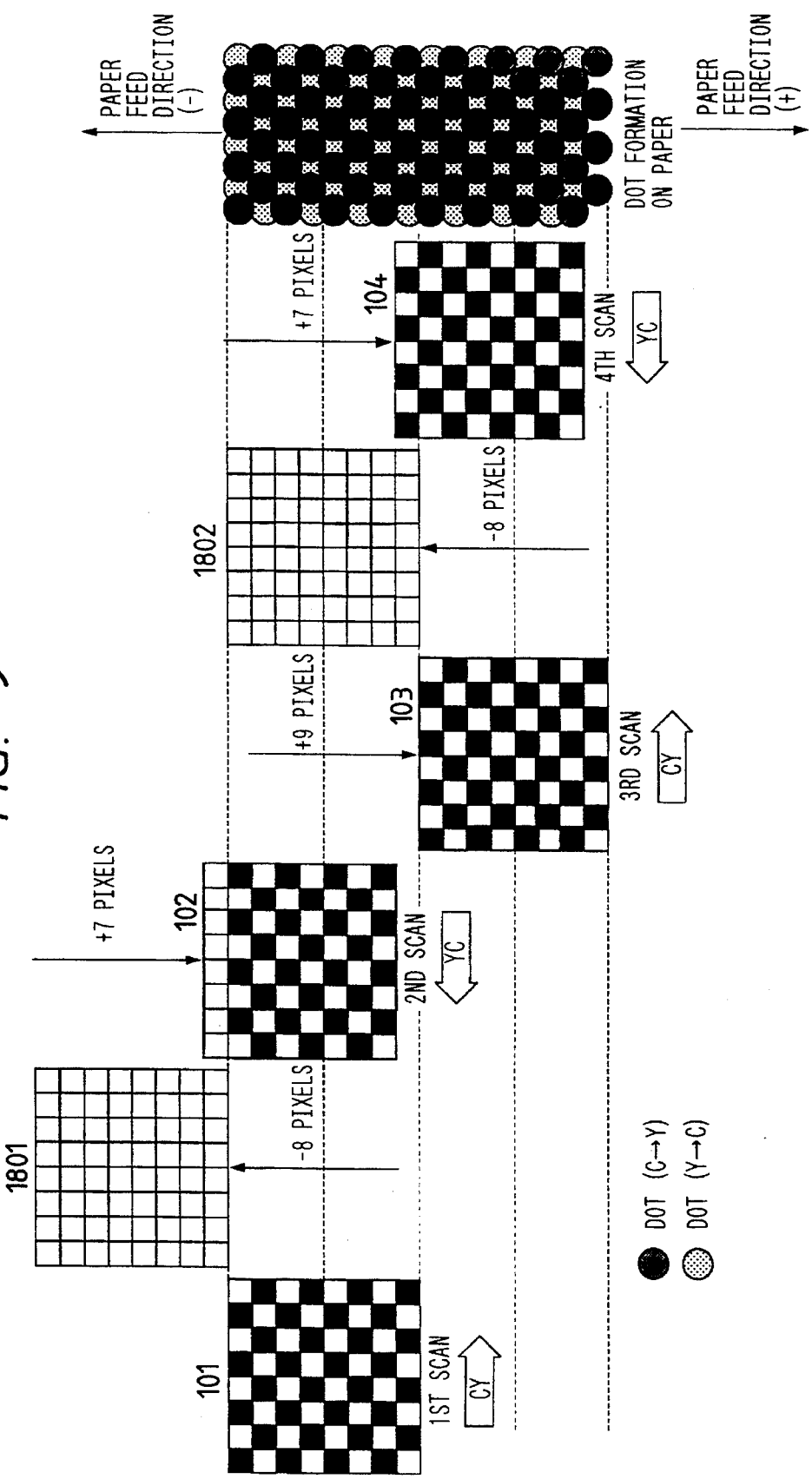
FIG. 9 is a view for explaining a recording method in the fourth embodiment.

As the fourth embodiment, a paper feed method for performing a precise back-feed operation will be described below. In FIG. 9, upon execution of the first embodiment shown in FIG. 4, the heads are relatively moved to a position 1801 or 1802 before the second or fourth scan for performing the back-feed operation. At this position, no recording is performed at all. Thereafter, the heads are moved to the position 102 or 104 again, and perform recording at the illustrated position as in the first embodiment. Such an arrangement is adopted to eliminate a paper feed amount error as much as possible. The idle amount of a paper feed gear, which does not appear in rotation in the "+" direction, appears as an error when the gear is rotated in the "–" direction. Therefore, the paper feed operation immediately before recording is performed to exceed a target position (102, 103) so that the position adjustment is always performed by rotating the gear in the "+" direction. In this case, the method of this embodiment is applied to the first embodiment, but may be effectively applied to the second, third, and fourth embodiments.

(Fifth Embodiment)

Figure 10:
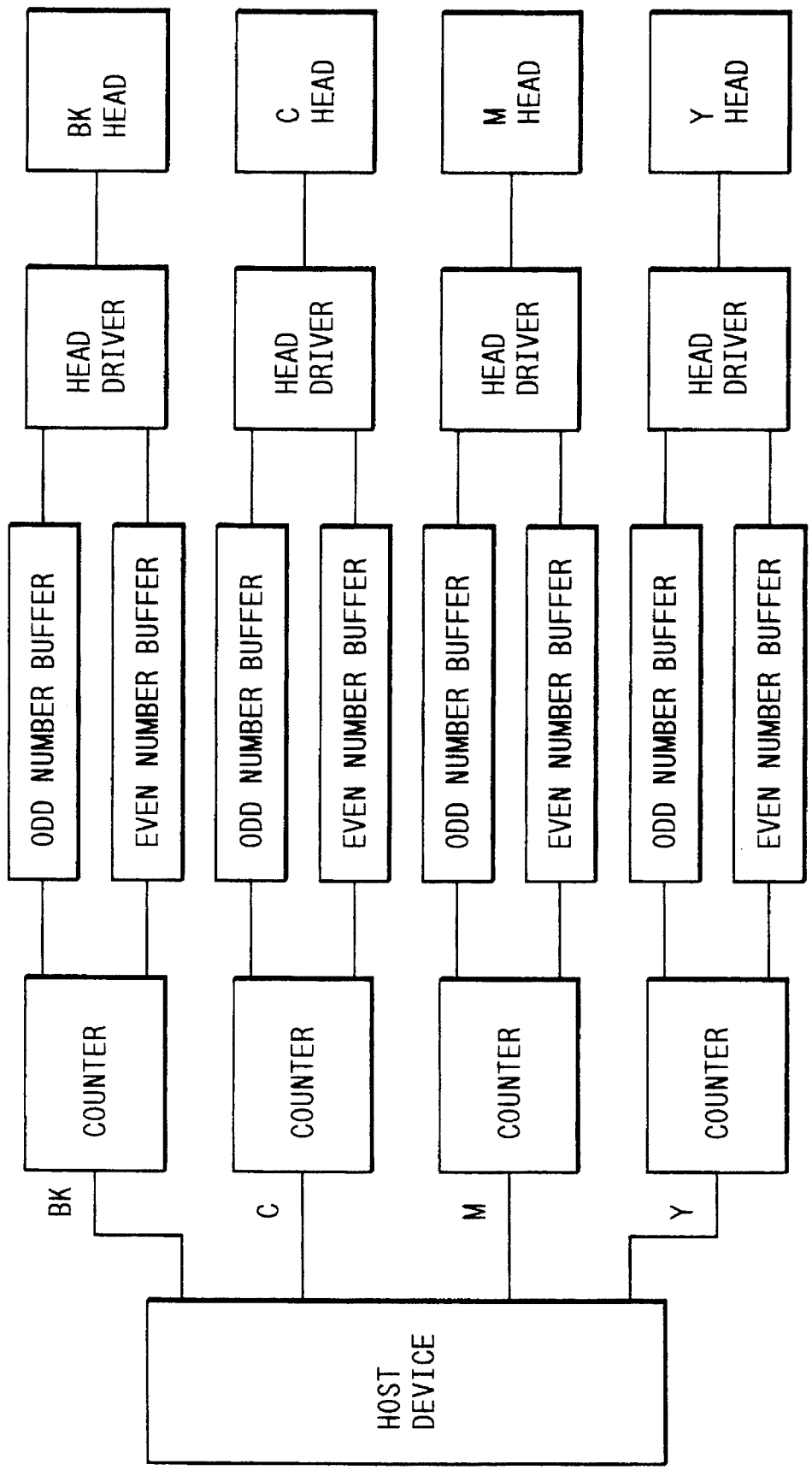
FIG. 10 is a block diagram showing an arrangement of a printer driver in the fifth embodiment.
Figure 11:
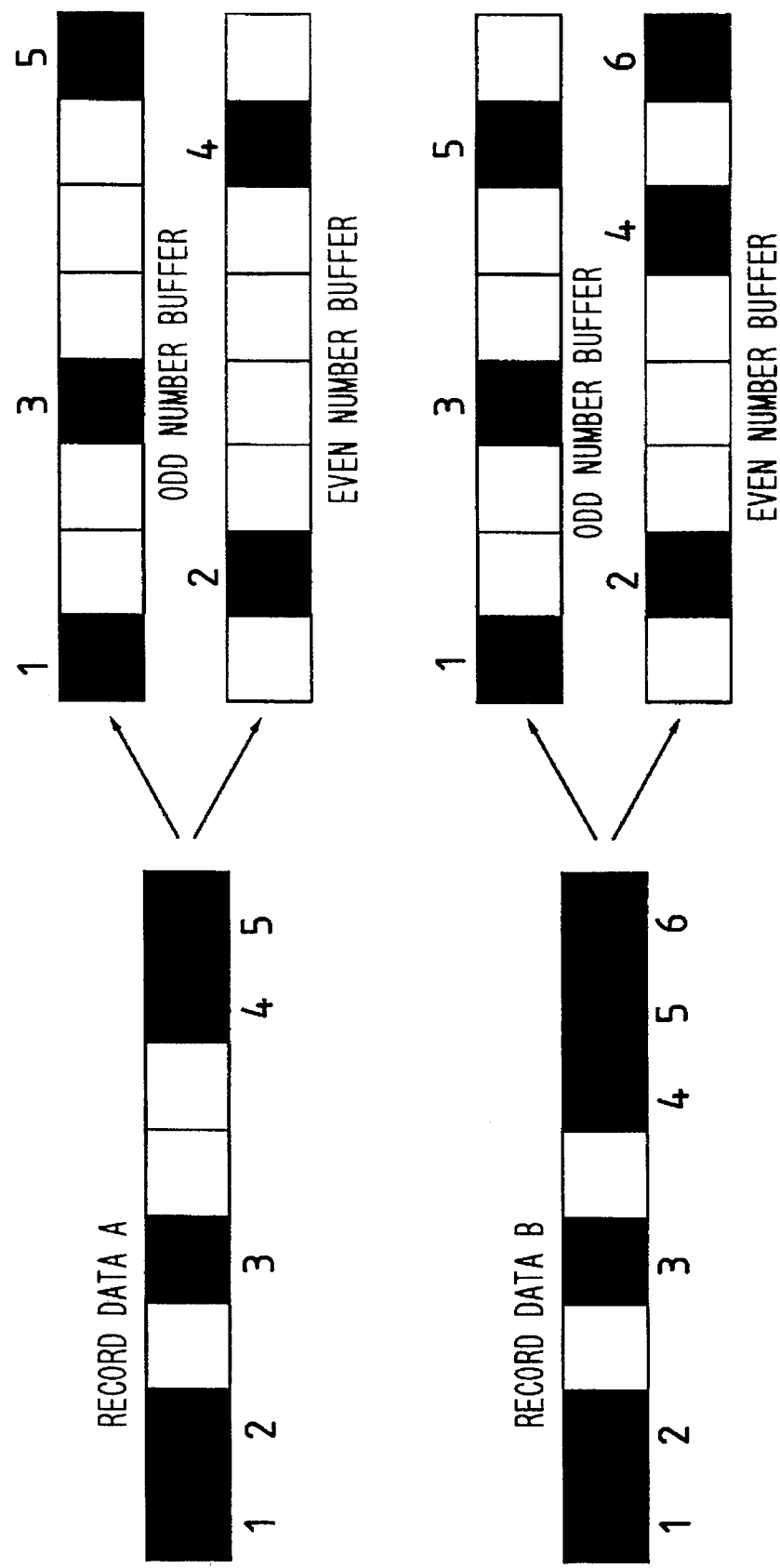
FIG. 11 is a view for explaining the operation of the printer driver shown in FIG. 10.
Figure 12C:
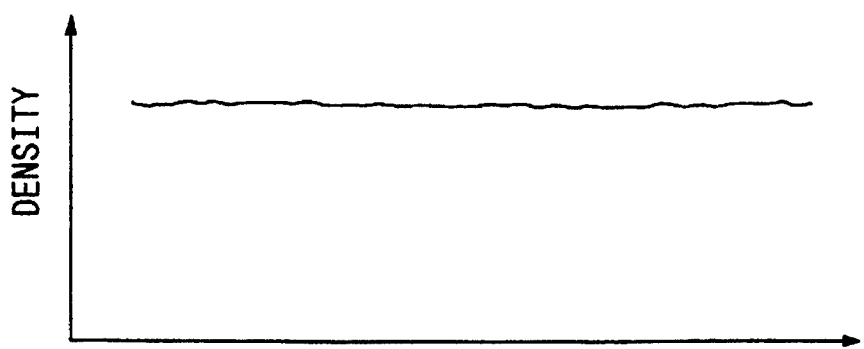
FIGS. 12A to 12C are views showing an ideal print state of an ink jet printer.
Figure 12B:
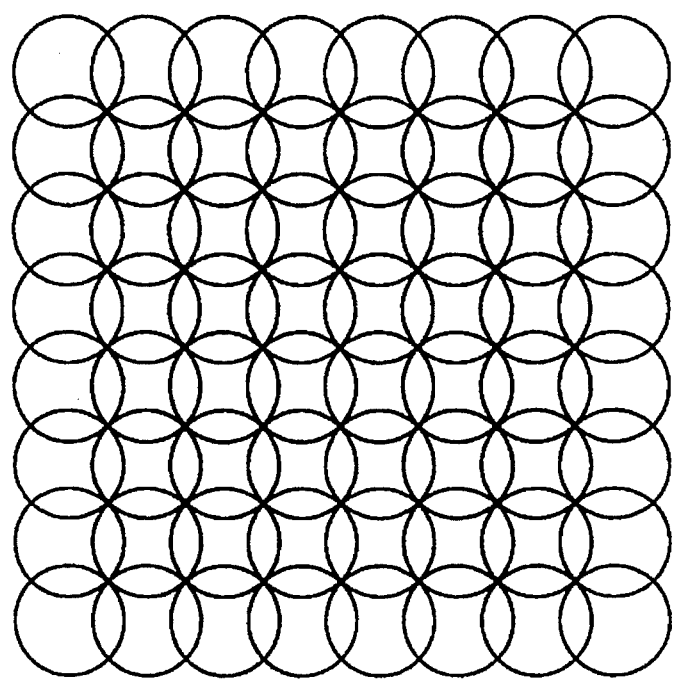
Figure 12A:
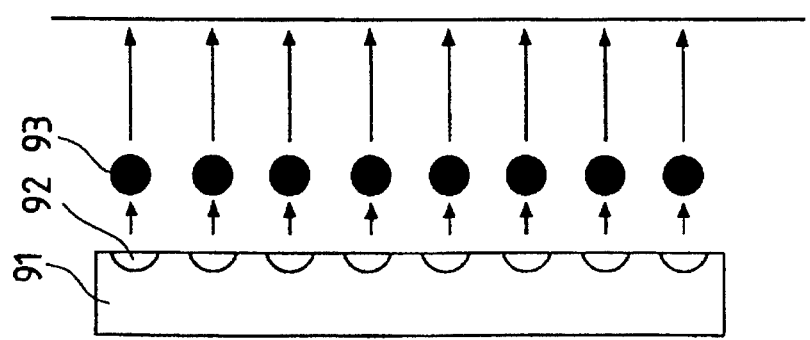
Figure 14C:
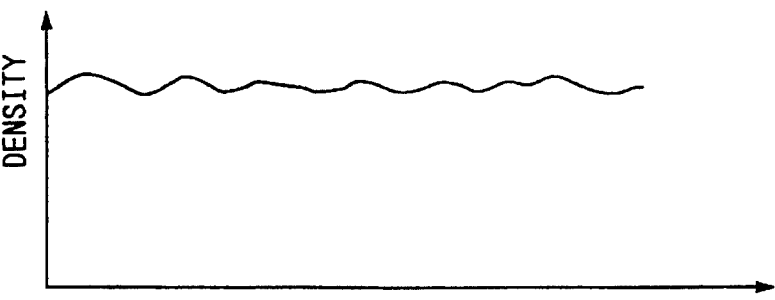
FIGS. 14A to 14C are views for explaining divisional recording.
Figure 14B:
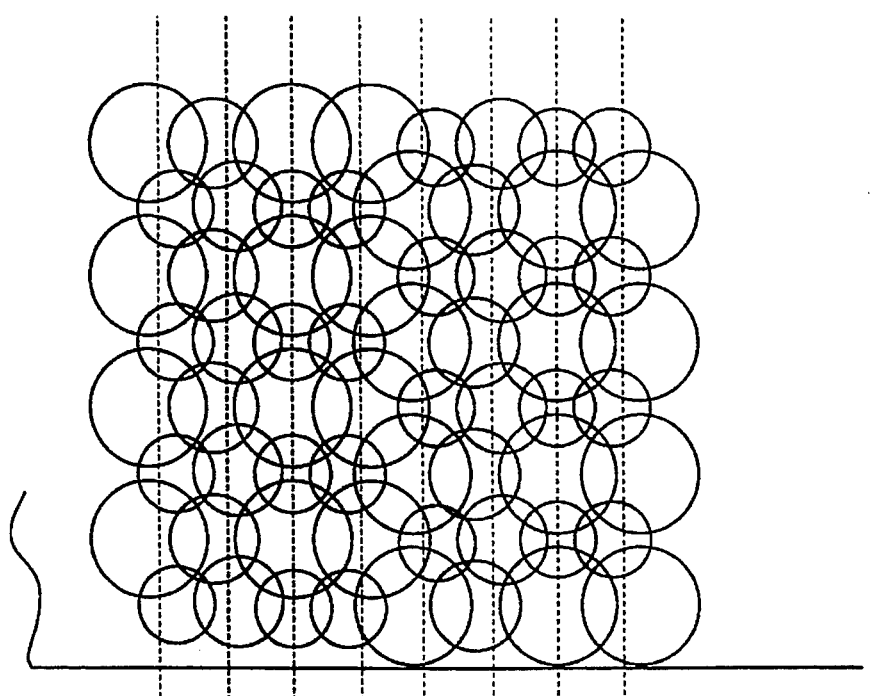
Figure 14A:
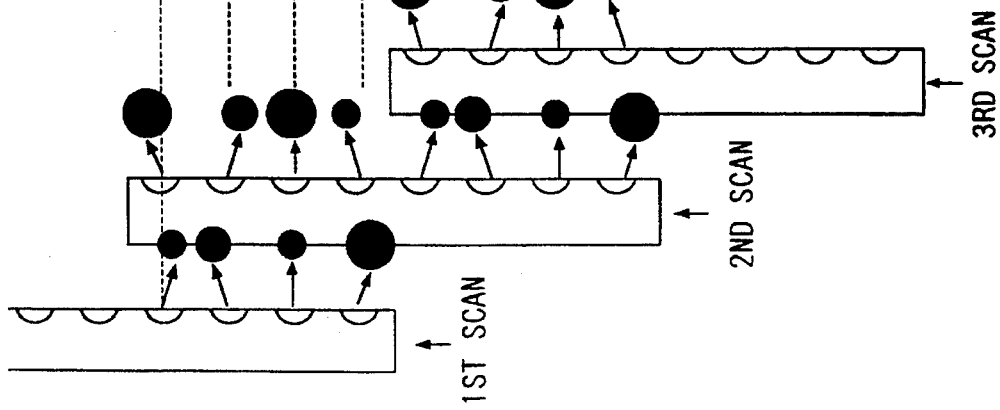
Figure 15A:
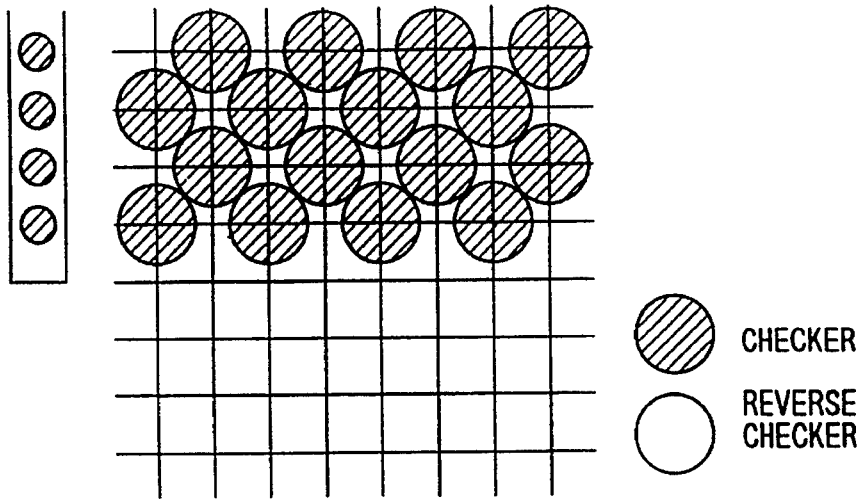
FIGS. 15A to 15C are views showing a print state by the divisional recording.
Figure 15B:
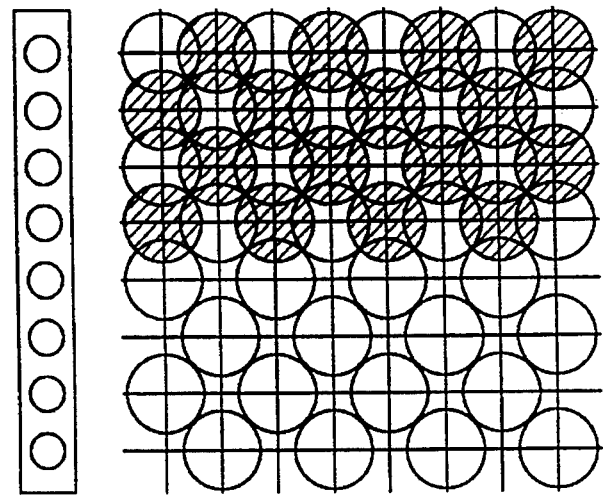
Figure 15C:
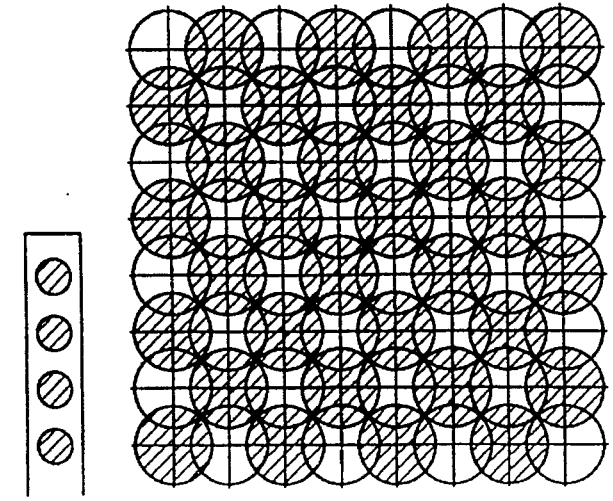
Figure 16:
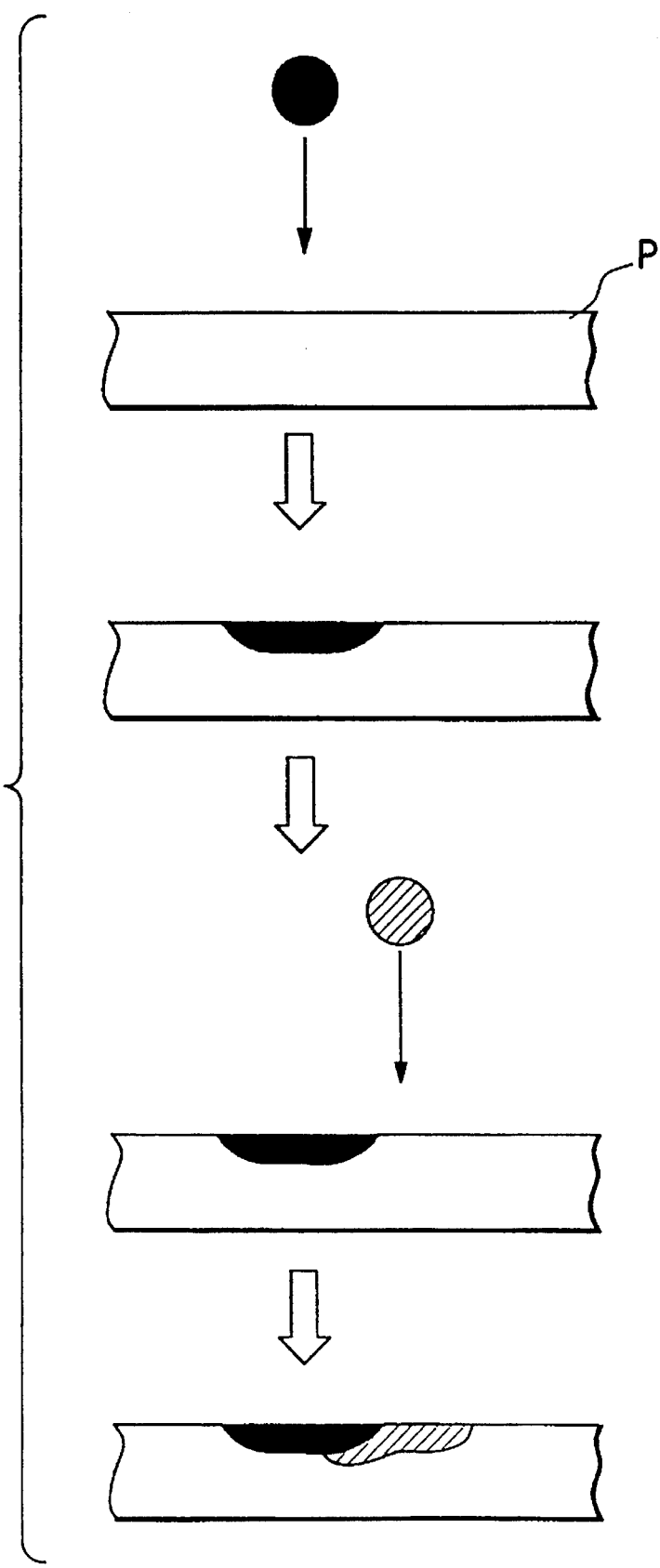
FIG. 16 is a sectional view showing an ink absorbing state on a sheet surface.

The fifth embodiment of the present invention will be described below. The above embodiments have exemplified the recording methods according to predetermined thinning arrangements such as checker and reverse checker patterns. FIG. 10 is a schematic block diagram of data transfer in a printer driver arranged in a recording apparatus of this embodiment. Print data supplied from a host apparatus are input to flip-flops in counters in units of colors, and data to be printed (ON data) are sequentially and alternately stored in corresponding odd and even number buffers. When data corresponding to the number of recording nozzles are stored in these buffers, the corresponding head drivers are driven to record data in the odd number buffers in the forward scan, and to record data in the even number buffers in the backward scan. FIG. 11 shows a distribution state of actual record data to these buffers. Assume that a recording signal such as recording data A is supplied to continuous pixels, in the main scan direction, of a certain color. At this time, the counter 10 shown in FIG. 10 counts only record pixels (1, 2, 3, 4, 5), odd number record pixels (1, 3, 5) are stored in the odd number buffer, and even number record pixels (2, 4) are stored in the even number buffer. Recording data B includes another record pixel before the fourth record pixel in the data A. Although the number of data is increased only by one, the record data distribution in the buffers is different from that of the record data A, as shown in FIG. 11.

When such a means is assembled in a driver of the recording apparatus, even when any record data is input, each pixel array continuous in the main scan direction can be equally recorded by two different nozzles. Therefore, there is no fear of nozzle nonuniformity unlike in divisional recording using checker and reverse checker patterns. Since one nozzle can be prevented from continuously recording several pixels unlike in the second embodiment, and two different nozzles alternately perform recording, a smoother, high-quality image can be expected. This embodiment is effective for nozzle nonuniformity. However, upon combination of the embodiments of the present invention, an image which is entirely smooth and has high image quality can be obtained in addition to the color nonuniformity reduction effect.

As described above, all pixels in an area, which can be recorded in a single main scan, are recorded by executing a plurality of main scans and sub-scans in accordance with a plurality of complementary thinning arrangements, and the pixels in the area are recorded by performing the sub-scan in a direction opposite to the normal direction at a predetermined period. Therefore, density nonuniformity caused by a recording time interval, density nonuniformity caused by recording elements, and the like can be removed, and a high-quality image can be obtained.

In the embodiments of the present invention, in particular, an ink jet type recording apparatus for performing recording by forming flying ink droplets by utilizing heat energy, of ink jet recording systems has been exemplified. As to its representative construction and principle, for example, one practiced by use of the basic principle disclosed in, for instance, U.S. Pat. Nos. 4,723,129 and 4,740,796 is preferred. The above system is applicable to either one of the so-called on-demand type and the continuous type. Particularly, the case of the on-demand type is effective because, by applying at least one driving signal which gives rapid temperature elevation exceeding nucleate boiling corresponding to the recording information on electrothermal converting elements arranged in a range corresponding to the sheet or liquid channels holding liquid (ink), a heat energy is generated by the electrothermal converting elements to effect film boiling on the heat acting surface of the recording head, and consequently the bubbles within the liquid (ink) can be formed in correspondence to the driving signals one by one. By discharging the liquid (ink) through a discharge port by growth and shrinkage of the bubble, at least one droplet is formed. By making the driving signals into pulse shapes, growth and shrinkage of the bubble can be effected instantly and adequately to accomplish more preferably discharging of the liquid (ink) particularly excellent in accordance with response characteristics.

As the driving signals of such pulse shapes, the signals as disclosed in U.S. Pat. Nos. 4,463,359 and 4,345,262 are suitable. Further excellent recording can be performed by using the conditions described in U.S. Pat. No. 4,313,124 of the invention concerning the temperature elevation rate of the above-mentioned heat acting surface.

As a construction of the recording head, in addition to the combined construction of a discharging orifice, a liquid channel, and an electrothermal converting element (linear liquid channel or right angle liquid channel) as disclosed in the above specifications, the construction by use of U.S. Pat. Nos. 4,558,333 and 4,459,600 disclosing the construction having the heat acting portion arranged in the flexed region is also included in the invention.

The present invention can be also effectively constructed as disclosed in Japanese Laid-Open Patent Application No. 59-123670 which discloses the construction using a slit common to a plurality of electrothermal converting elements as a discharging portion of the electrothermal converting element or Japanese Laid-Open Patent Application No. 59-138461 which discloses the construction having the opening for absorbing a pressure wave of a heat energy corresponding to the discharging portion.

Further, as a recording head of the full line type having a length corresponding to the maximum width of a recording medium which can be recorded by the recording apparatus, either the construction which satisfies its length by a combination of a plurality of recording heads as disclosed in the above specifications or the construction as a single recording head which has integratedly been formed can be used.

In addition, the invention is effective for a recording head of the freely exchangeable chip type which enables electrical connection to the main device or supply of ink from the main device by being mounted onto the main device, or for the case by use of a recording head of the cartridge type provided integratedly on the recording head itself.

It is also preferable to add a restoration means for the recording head, preliminary auxiliary means, and the like because the effect of the invention can be further stabilized. Specific examples of them may include, for the recording head, capping means, cleaning means, pressurization or aspiration means, and electrothermal converting elements or another heating element or preliminary heating means according to a combination of them. It is also effective for performing a stable recording to realize the preliminary mode which executes the discharging separately from the recording.

In the embodiments of the present invention, an ink is described as a liquid. Alternatively, the present invention may employ an ink which is solidified at room temperature or less, and is softened or liquefied at room temperature, or an ink, which is liquefied upon application of a use recording signal since it is a general practice to perform temperature control of the ink itself within a range between 30° C. and 70° C. in an ink jet system so that the ink viscosity can fall within a stable ejection range.

In addition, a temperature rise caused by heat energy may be prevented by positively utilizing the temperature rise as energy for a change in state from a solid state to a liquid state of the ink, or an ink which is solidified in a non-use state for the purpose of preventing evaporation of the ink may be used. In any case, the present invention can be applied to a case wherein an ink, which can be liquefied by heat energy such as an ink which is liquefied upon application of heat energy according to a recording signal, and is ejected in a liquid state, an ink which begins to be solidified when it reaches a recording medium, or the like may be used. In this case, an ink may be held in a liquid or solid state in recess portions or through holes of a porous sheet, as described in Japanese Laid-Open Patent Application No. 54-56847 or 60-71260, and the porous sheet may be arranged to oppose electrothermal converting elements. In the present invention, the above-mentioned film boiling system is most effective for the above-mentioned inks.

Moreover, the recording apparatus of the present invention may be used as an integrated or separate image output terminal of an information processing equipment such as a wordprocessor, a computer, or the like, or a copying machine as a combination of the recording apparatus, a reader, and the like, or a facsimile apparatus having a transmission/reception function.

The present invention is not limited to an ink jet system utilizing heat energy, but can also be applied to an ink jet system utilizing, e.g., a piezo element.

What is claimed is:

1. An ink jet recording method for recording an image on a recording medium by performing a main scan in a predetermined direction by recording means comprising a plurality of recording elements for ejecting an ink, and by performing a sub-scan by moving the recording means relative to the recording medium in a direction different from the predetermined direction after the end of the main scan, said method comprising the steps of:

thinning a portion of all pixels on an area recordable in a single main scan of the recording means in accordance with a predetermined thinning arrangement pattern; and recording an image obtained by thinning the portion of the pixels and an image corresponding to the portion of the pixels in the area in a plurality of main scans and sub-scans, such that a sub-scan is performed in a direction opposite to a normal sub-scan direction at a predetermined period.

2. A method according to claim 1, wherein the plurality of recording elements of the recording means are aligned in a direction substantially perpendicular to the predetermined direction, and the main scan is performed in said recording step by reciprocally moving the recording means in the predetermined direction.

3. A method according to claim 2, wherein the main scans are respectively performed in said recording step in forward and backward paths of the reciprocal movement.

4. A method according to claim 3, wherein in said thinning step, in accordance with the predetermined thinning arrangement pattern, all the pixels of the area are divided into images of n groups of pixels, and in said recording step, the recording of the area is completed by performing n reciprocal movements of the recording medium and 2n sub-scans, and a sub-scan after a forward movement and a sub-scan after a backward movement have different sub-scan amounts.

5. A method according to claim 1, wherein in said thinning step, a pattern in which pixels are aligned at non-neighboring positions in a checker pattern are used as the predetermined thinning arrangement pattern, and in said recording step, the sub-scan is performed after each main scan alternately by a 1-pixel width and (the 1-pixel width+a width according to a total number of recording elements of the recording means) in opposite directions.

6. A method according to claim 1, wherein in said thinning step, a pattern in which an m×n pixel group is used as a unit group, and the pixel groups are aligned at non-neighboring positions in a checker pattern is used as the predetermined thinning arrangement pattern and in said recording step, the sub-scan is performed after each main scan alternately by an n-pixel width and (the n-pixel width+a width according to a total number of recording elements of the recording means) in opposite directions.

7. A method according to claim 1, wherein the recording means comprises recording element arrays for ejecting inks in different colors in the predetermined direction.

8. A method according to claim 1, wherein each of the recording elements ejects an ink droplet by causing a change in state in the ink by generating heat energy.

9. An ink jet recording method for recording an image on a recording medium by performing a main scan in a predetermined main scan direction using recording means comprising a plurality of recording elements for ejecting an ink, and by performing a sub-scan by moving the recording means relative to the recording medium in a sub-scan direction different from the main scan direction after the end of the main scan, said method comprising the steps of:

performing a first main scan using the recording means to record an image according to a first pixel thinning arrangement on a first record section on the recording medium;

performing a first sub-scan such that the recording means is located at an upstream side in the sub-scan direction with respect to the first record section after the end of the first main scan in said first main scan performing step;

performing a second main scan so as to record an image according to a second pixel thinning arrangement on a portion of the first record section, the second pixel thinning arrangement having a complementary relationship with the first pixel thinning arrangement;

performing a third main scan using the recording means to record an image according to the first pixel thinning arrangement on a second record section adjacent to the first record section on the recording medium;

performing a second sub-scan such that the recording means is located at an upstream position in the sub-scan direction with respect to the second record section after the end of said third main scan performing step; and performing a fourth main scan so as to record an image according to the second pixel thinning arrangement on a remaining portion of the first record section and a portion of the second record section.

10. A method according to claim 9, wherein the plurality of recording elements of the recording means are aligned in a direction different from the predetermined main scan direction, and in said first, second, third and fourth main scan performing steps, the main scan is performed by reciprocally moving the recording means in the predetermined main scan direction.

11. A method according to claim 10, wherein in said main scan performing steps, the main scans are respectively performed in forward and backward paths of the reciprocal movement.

12. A method according to claim 9, wherein in said main scan performing steps, the first and second pixel thinning arrangements are patterns in each of which pixels are aligned at non-neighboring positions in a checker pattern.

13. A method according to claim 9, wherein in said main scan performing steps, the first and second pixel thinning arrangements are patterns in each of which an (m×n) pixel group is used as a unit group, and the pixel groups are aligned at non-neighboring positions in a checker pattern.

14. A method according to claim 9, wherein for said second and fourth main scan performing steps, the recording means is moved in a direction opposite to the sub-scan direction by a first predetermined amount.

15. A method according to claim 14, wherein for said third main scan performing step, the recording means is moved in the sub-scan direction by a second predetermined amount before said third main scan performing step.

16. A method according to claim 15, wherein the second predetermined amount is a distance obtained by adding the first predetermined amount and a recording width by the plurality of recording elements of the recording means.

17. A method according to any one of claims 9 to 16, wherein in said main scan performing steps, the recording means comprises recording element arrays for ejecting inks in different colors in the predetermined main scan direction.

18. A method according to claim 17, wherein in said main scan performing steps, each of the recording elements ejects an ink droplet by causing a change in state in the ink by generating heat energy.

19. A method according to any one of claims 9 to 16, wherein in said main scan performing steps, each of the recording elements ejects an ink droplet by causing a change in state in the ink by generating heat energy.

* * * * *